US011641933B2

(12) United States Patent
Dai et al.

(10) Patent No.: US 11,641,933 B2
(45) Date of Patent: May 9, 2023

(54) PHOTOSENSITIVE PRESSURE ALARM DEVICE FOR ELECTRIC CLEANING CARE APPLIANCES

(71) Applicant: Shanghai Shift Electrics Co., Ltd., Shanghai (CN)

(72) Inventors: Xiaoguo Dai, Shanghai (CN); Zhenwu Xu, Shanghai (CN)

(73) Assignee: SHANGHAI SHIFT ELECTRICS CO., LTD., Shanghai (CN)

( * ) Notice: Subject to any disclaimer, the term of this patent is extended or adjusted under 35 U.S.C. 154(b) by 431 days.

(21) Appl. No.: 16/760,745

(22) PCT Filed: Nov. 20, 2017

(86) PCT No.: PCT/CN2017/111857
§ 371 (c)(1),
(2) Date: Apr. 30, 2020

(87) PCT Pub. No.: WO2019/095365
PCT Pub. Date: May 23, 2019

(65) Prior Publication Data
US 2020/0342740 A1    Oct. 29, 2020

(30) Foreign Application Priority Data

Nov. 14, 2017    (CN) .......................... 201711125025.4

(51) Int. Cl.
*A46B 15/00* (2006.01)
*G01L 1/24* (2006.01)
(Continued)

(52) U.S. Cl.
CPC ...... *A46B 15/0012* (2013.01); *A46B 15/0044* (2013.01); *A61C 17/221* (2013.01);
(Continued)

(58) Field of Classification Search
CPC ............ A46B 15/0012; A46B 15/0044; A61C 17/221; A61C 17/26; G01L 1/24
See application file for complete search history.

(56) References Cited

U.S. PATENT DOCUMENTS

| 4,045,971 A | 9/1977 | Brenner, Jr. |
| 2012/0310593 A1 | 12/2012 | Bates et al. |
| (Continued) | | |

FOREIGN PATENT DOCUMENTS

| CN | 102427863 A | 4/2012 |
| CN | 202933039 U | 5/2013 |
| (Continued) | | |

OTHER PUBLICATIONS

International Patent Application No. PCT/CN2017/111857; Int'l Written Opinion and Search Report; dated Aug. 3, 2018; 7 pages.

(Continued)

*Primary Examiner* — Laura C Guidotti
(74) *Attorney, Agent, or Firm* — BakerHostetler

(57) ABSTRACT

A photosensitive pressure alarm device for electric cleaning care appliances comprises at least one light source, at least one photosensitive unit, a light reflecting surface, a detection circuit, and an alarm portion. The light source and the photosensitive unit are provided on a movable component or a movable component on a same side, and the light reflecting surface is provided on a stationary component or the movable component. Under the combined action of an external force ($F_1$) and an elastic force ($F_2$), the light reflecting surface or the light source and the photosensitive unit provided on the movable component can move with the movable component, and the incident angle and the reflection angle of the light on the light reflecting surface change, causing that the light receiving area of the photosensitive (Continued)

unit changes, and in turn resulting in change of the electrical performance of the photosensitive unit.

8 Claims, 14 Drawing Sheets

(51) Int. Cl.
    *A61C 17/26*     (2006.01)
    *A61C 17/22*     (2006.01)
(52) U.S. Cl.
    CPC ............ *A61C 17/26* (2013.01); *G01L 1/24* (2013.01); *A46B 2200/1066* (2013.01); *A61C 17/225* (2013.01); *A61C 2204/00* (2013.01)

(56) References Cited

U.S. PATENT DOCUMENTS

| | | | |
|---|---|---|---|
| 2015/0230898 A1 | 8/2015 | Miller | |
| 2016/0192769 A1 | 7/2016 | Bloch et al. | |
| 2016/0331120 A1* | 11/2016 | Scheele | .................. A46B 5/007 |

FOREIGN PATENT DOCUMENTS

| | | | | |
|---|---|---|---|---|
| CN | 103876849 A | 6/2014 | | |
| CN | 103932497 A | 7/2014 | | |
| CN | 105073063 A | 11/2015 | | |
| JP | H05-237014 A | 9/1993 | | |
| JP | 2015-527162 A | 9/2015 | | |
| JP | 2018-503472 A | 2/2018 | | |
| JP | 2018-514336 A | 6/2018 | | |
| JP | 2019-516448 A | 6/2019 | | |
| WO | WO 2016/119136 A1 | 8/2016 | | |
| WO | WO 2016/174621 A1 | 11/2016 | | |
| WO | WO 2016/181255 A1 | 11/2016 | | |
| WO | WO 2017/202913 | * | 11/2017 | ........... A61C 17/221 |

OTHER PUBLICATIONS

European Patent Application No. 17932237.5; Search Report; dated Nov. 2, 2020; 4 pages.

International Patent Application No. PCT/CN2017/111857; Int'l Search Report; dated Aug. 3, 2018; 4 pages.

* cited by examiner

PHOTOSENSITIVE PRESSURE ALARM DEVICE FOR ELECTRIC CLEANING CARE APPLIANCES

CROSS-REFERENCE TO RELATED APPLICATIONS

This application is the U.S. National Stage of International Application No. PCT/CN2017/111857, filed Nov. 20, 2017, which claims the benefit of China Patent Application No. 201711125025.4, filed Nov. 14, 2017, the disclosures of which are incorporated herein by reference in their entireties.

TECHNICAL FIELD

The present invention relates to a pressure alarm device for electric cleaning care appliances, especially for electric toothbrushes, and in particular, to a photosensitive pressure alarm device for electric cleaning care appliances.

BACKGROUND

As is known to all, according to drive types, the existing electric cleaning care appliances are generally divided into two types: the first type of electric cleaning care appliance uses a driver comprising a micro-motor and a gear transmission system, so that a head drive shaft moves with the movement of a handle drive shaft driven by the motor (hereinafter referred to as a transmission-type electric cleaning care appliance); and the second type of electric cleaning care appliance uses a driver comprising a transducer, a drive coil and a drive coil core provided in the drive coil, to convert input electrical energy into mechanical energy (hereinafter referred to as an electric cleaning care appliance of the resonance oscillation type).

The Chinese invention patent with the authorization announcement number CN102813558B enjoyed by the applicant discloses a pressure alarm device for electric cleaning care appliances. It utilizes the characteristic that a DC permanent magnet micro-motor has different working currents under different loads. A voltage sensor measures a voltage value in a use state and a voltage value in an initial state in which the brush head rotates but the bristles are not in contact with the teeth to be cleaned, respectively, and obtains the difference between the two voltage values. When the force exerted by a user on the brush head is greater than a set value, a detection module detects that the voltage difference on the voltage sensor is greater than the set value, an IC issues a signal, and a corresponding indication element for reflecting the pressure in an indication module issues an indication to remind the user that the force applied to the brush head is excessive.

Although the above technical solution can realize a pressure alarm function, there are many factors that interfere with the working current of the DC permanent magnet micro-motor, such as the friction between the bristles and the teeth, the shape of the bristles, harmonics generated by the commutator of the DC permanent magnet micro-motor, thereby affecting the accuracy of pressure alarms.

The Chinese invention patent application with the application publication number of CN104619212A discloses a resonance oscillation drive electric toothbrush which uses a Hall-effect sensor and has a pressure sensing capability. In the resonance oscillation drive electric toothbrush, a magnet is positioned to move with the movement of a brush head assembly, the Hall-effect sensor is installed in a magnetic field generated by the magnet, the magnetic field response has a phase shift relative to the phase of a drive signal, a processor is utilized to determine the phase shift of the Hall sensor output caused by a brush element during the tooth brushing operation, and a signal indicative of the load is produced according to stored information in an appliance which relates the phase shift value to the load.

SUMMARY

An object of the present invention is to provide a photosensitive pressure alarm device for electric cleaning care appliances, which can make up for the deficiencies of existing alarm device for cleaning care appliances and improve the accuracy of pressure detection and alarm.

A cleaning care appliance provided by the present invention comprises a handle housing, a drive assembly, a cleaning assembly comprising a cleaning element, and a photosensitive pressure alarm device. The photosensitive pressure alarm device comprises a light sensing part composed of at least one light source and at least one photosensitive unit, a light reflecting surface facing the light source and the photosensitive unit, a detection circuit and an alarm part. The light source and the photosensitive unit are provided on a movable component movable relative to the handle housing or a stationary component which does not move relative to the handle housing and on a same side, and the light reflecting surface is provided on a stationary component or a movable component facing the side on which the light source and the photosensitive unit are provided and roughly directly faces the light source and the photosensitive unit. Under the combined action of an external force $F_1$ which is applied to the cleaning element and of which the direction is approximately along or parallel to an axis along the length direction of the cleaning element and an elastic-member elastic force $F_2$ which resists the external force $F_1$ and is generated by an elastic member built into a handle, the light reflecting surface or the light source and the photosensitive unit provided on the movable component movable relative to the handle housing move with the movable component, and the incident angle and the reflection angle of the light emitted by the light source on the light reflecting surface change, causing that the light receiving area of the photosensitive unit which can receive the light from the light source changes, and in turn resulting in change of the electrical performance of the photosensitive unit.

The light source may be a stable light source actively emitting light, and the photosensitive unit may be an electronic device of which the resistance value or the conductivity changes significantly after being illuminated by light. Preferably, the light source is a light emitting diode (LED), and the photosensitive unit is a photosensitive resistor.

For the transmission-type electric cleaning care appliances, the drive assembly comprises a micro-motor, a gearbox and a drive shaft, and the drive assembly may integrally rotate around the axis $L_3$ of a rotation shaft of a brush head interface member; the handle housing comprises a handle upper shell and a handle lower shell, and the elastic member is provided in the handle lower shell and plays a reset role; and the elastic-member upper end is directly or indirectly coupled to the handle lower shell of the handle part, the position of the upper end of the elastic member is unchanged relative to the handle housing, and the lower end of the elastic member is coupled to the micro-motor. When there is no external force acting on the cleaning element, the elastic member is in a pre-tightened state, and a pre-tightening force $F_3$ of the elastic member acts on the micro-motor, such that the micro-motor and the handle lower shell maintain a relatively fixed position; and when the external force $F_1$ is applied to the cleaning element, the micro-motor moves toward or away from the upper end of the elastic member, and the lower end of the elastic member produces a deformation relative to the handle housing under the action of the external force $F_1$. The light source and the photosensitive unit are provided on a side of a circuit board facing the gearbox, the circuit board is fixed on a motor frame, and the light reflecting surface is provided on the gearbox; and vice versa.

Preferably, the distance from the action point of the elastic force produced by the elastic member to the axis $L_3$ of the rotation shaft of the brush head interface member is greater than 0.35 times the distance from the action point of the external force $F_1$ to the axis $L_3$ of the rotation shaft of the brush head interface member.

Preferably, the photosensitive pressure alarm device of the present invention further comprises a recess provided in the gearbox, the recess comprises the light reflecting surface, a recess side surface of the gearbox and a recess top surface of the gearbox. The recess side surface of the gearbox and the recess top surface of the gearbox constitute a light sensing shielding part.

In another embodiment, the light source is provided next to the photosensitive unit, the light source and/or the photosensitive unit partially or completely enters the light sensing shielding part, the light source, the photosensitive unit and the light reflecting surface maintain a gap with each other, and the gap is greater than 0.1 mm.

For the electric cleaning care appliances of the resonance oscillation type, the drive assembly comprises a driver bracket fixed by the handle housing, a drive shaft, two transducer drive arms symmetrically distributed along the longitudinal axis $L_5$ of the drive shaft, elastic members respectively fixedly coupled to the upper ends of the two transducer drive arms close to the cleaning element via an elastic-member fixing member, two permanent magnets which are provided below the two transducer drive arms away from the the cleaning element and of which the directions of the internal magnetic field lines are opposite, and a drive coil provided between the two permanent magnets. The drive shaft, the transducer drive arms and the permanent magnets are movable components, the light source and the photosensitive unit are provided on a circuit board in a stationary component, the light reflecting surface is provided on the transducer drive arms in the movable components, and the light emitted by the light source is reflected by the light reflecting surface to the photosensitive unit.

Preferably, the elastic member is a sheet-shaped member, the elastic member is symmetrically distributed along the longitudinal axis $L_5$ of the drive shaft, and the length of the elastic member along a direction of the elastic member from the elastic-member fixing member toward a corresponding transducer drive arm and the width of the elastic member along a direction of the elastic member parallel to the longitudinal axis $L_5$ of the drive shaft are equal to or greater than 5 times the thickness of the elastic member.

More preferably, an elastic-member stiffness coefficient of the elastic member in a direction perpendicular to the longitudinal axis $L_5$ of the drive shaft and perpendicular to the length direction of the elastic member is far less than an elastic-member stiffness coefficient of the elastic member along the direction of the longitudinal axis $L_5$ of the drive shaft, and the elastic-member stiffness coefficient of the elastic member in the direction perpendicular to the longitudinal axis $L_5$ of the drive shaft and perpendicular to the length direction of the elastic member is far less than an elastic-member stiffness coefficient of the elastic member along the length direction of the cleaning element, and said "far less than" means equal to or less than $1/10$.

In a still another embodiment of the present invention, the cleaning care appliance is of the transmission type, comprising a handle housing, a drive assembly, and a cleaning assembly comprising a cleaning element. The drive assembly comprises a micro-motor, a gearbox and a drive shaft, and the drive assembly may integrally rotate around the axis $L_3$ of a rotation shaft of a brush head interface member; the handle housing comprises a handle upper shell and a handle lower shell, and an elastic member is provided in the handle lower shell and plays a reset role; and the upper end of the elastic member is directly or indirectly coupled to the handle lower shell of the handle part, the position of the upper end of the elastic member is unchanged relative to the handle housing, and the lower end of the elastic member is coupled to the micro-motor. When there is no external force acting on the cleaning element, the elastic member is in a pre-tightened state, and a pre-tightening force $F_3$ of the elastic member acts on the micro-motor, such that the micro-motor and the handle lower shell maintain a relatively fixed position; and when the external force $F_1$ is applied to the cleaning element, the micro-motor moves toward or away from the upper end of the elastic member, and the lower end of the elastic member produces a deformation relative to the handle housing under the action of the external force $F_1$. A light source is provided on a circuit board which is stationary relative to the handle lower shell or on a movable component which moves relative to the handle lower shell under the combined action of an external force $F_1$ and an elastic-member elastic force $F_2$, a photosensitive unit is provided on a movable component which moves relative to the handle lower shell or on a circuit board which is stationary relative to the handle lower shell, and the light emitted by the light source directly irradiates the photosensitive unit.

As compared to the existing pressure alarm devices, the accuracy of the pressure alarm device of the present invention may be increased by 20 times.

BRIEF DESCRIPTION OF THE DRAWINGS

In the following, an electric toothbrush will be taken as a typical example of the electric cleaning care appliance of the present invention, and exemplary embodiments of the present invention will be described in greater detail in conjunction with the drawings.

EXPLANATION OF REFERENCE SIGNS OF MAIN COMPONENTS

Figure 1:
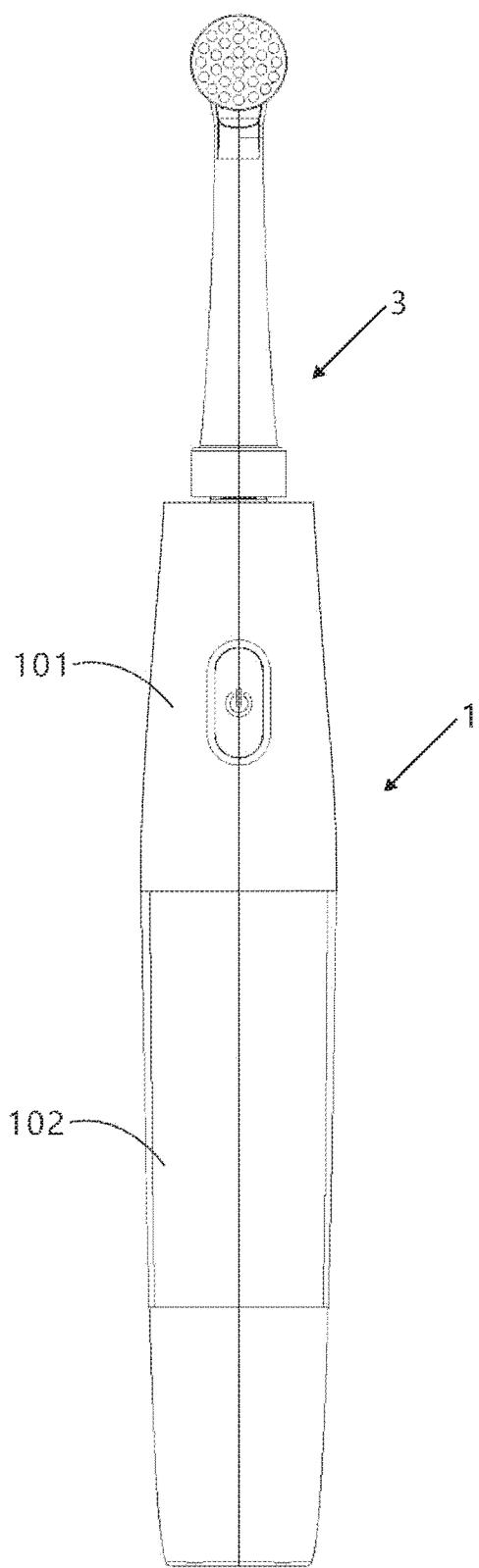
FIG. 1 is a front view of the electric cleaning care appliance.
Figure 2:
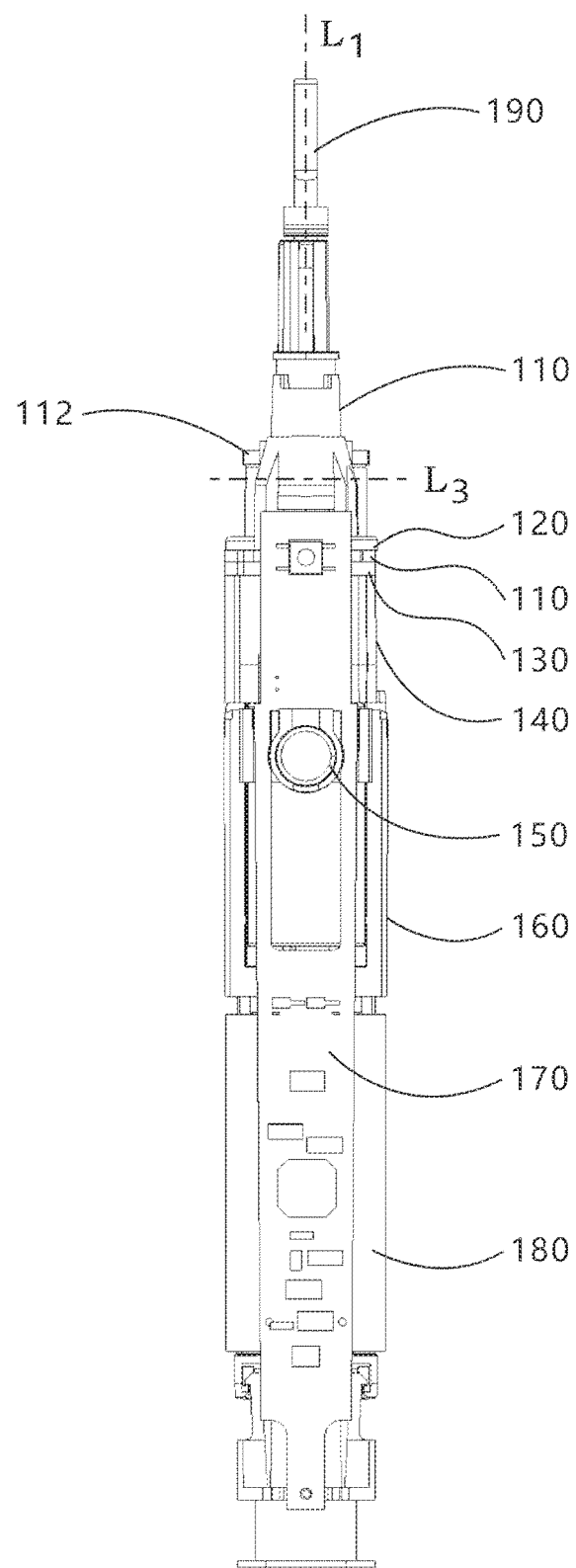
FIG. 2 is a front view of the internal assemblies of the handle.

1 Handle
3, 203 Cleaning assemblies provided on the first type and the second type of cleaning care appliance, respectively
101 Handle upper shell
102 Handle lower shell
104 Recess in the handle upper shell
110 Brush head interface member
111 Interface for the brush head interface member
112 Rotation shaft of the brush head interface member
120 Gearbox fastening member
130 Bottom cover for the brush head interface member
140 Gearbox
141 Light reflecting surface
142 Bottom end surface of the gearbox
143 Recess side surface of the gearbox
144 Recess top surface of the gearbox
150, 223, 224 Elastic members provided on the first type and the second type of cleaning care appliances, respectively
151 Elastic-member upper end
152 Elastic-member lower end
160 Motor frame
161 Micro-motor
162 Front end surface of the motor frame
163 Motor fastening member
170 Circuit board
171, 571 Photosensitive unit
172, 572 Light source
173, 175, 576 Light emitted emitted by the light source
174, 176 Reflected light
141, 541, 241 Light reflecting surfaces provided on the first type and the second type of cleaning care appliances, respectively
177 Light receiving surface of the photosensitive unit
577 Initial light-receiving surface of the photosensitive unit
578 In-process light-receiving surface of the photosensitive unit
180 Battery
190, 220 Drive shafts of the first type and the second type of cleaning care appliances, respectively
201 Handle housing
221, 222 Driver bracket
225, 226 Permanent magnet
227 Drive coil
230, 330 Cleaning elements provided on the first type and the second type of cleaning care appliances, respectively
235, 236 Transducer drive arm
237 Elastic-member fixing member
228, 229 Drive coil bracket
310 Cleaning-assembly housing
320 Cleaning-assembly coupling member
331 Cleaning-element carrier
$L_1$, $L_5$ Longitudinal axes of the drive shafts of the first type and the second type of cleaning care appliances, respectively
$L_2$ Rotation axis of the cleaning-element carrier which is approximately parallel to the axis along the length direction of the cleaning element
$L_3$ Axis of the rotation shaft of the brush head interface member
$L_4$ Axis along the length direction of the cleaning element
$F_1$ Pressure or partial pressure (pressure component) which is applied to the cleaning element and of which the direction is approximately along or parallel to the axis along the length direction of the cleaning element, collectively called an external force in this specification
$F_2$ Elastic-member elastic force generated by the elastic member
$F_3$ Elastic-member pre-tightening force generated by the elastic member
R Photosensitive resistor
$R_0$ Initial photosensitive resistance value
$R_1$ In-process photosensitive resistance value
$R_2$, $R_4$ Fixed resistor
α1 Reflecting-surface initial incident angle of light on the light reflecting surface
β1 Reflecting-surface initial reflection angle of light on the light reflecting surface
α2 Reflecting-surface in-process incident angle of light on the light reflecting surface
β2 Reflecting-surface in-process reflection angle of light on the light reflecting surface
α3 Initial light-receiving-surface incident angle of light on the initial light-receiving surface of the photosensitive unit
α4 In-process light-receiving-surface incident angle of light on the in-process light-receiving surface of the photosensitive unit
LED Light emitting diode
I/O1 Input/output detection port I/O of MCU

DETAILED DESCRIPTION

Although an electric toothbrush is taken as an example for explanation in the following, the present invention is not limited thereto. The present invention may also be applicable to a personal electric cleaning care appliance, such as an electric shaver, electric face cleaner, electric shower, etc.

For the sake of clarity, in this specification, words such as "above", "below", "upper", "lower", etc. that express a relative position in space are used to simply describe a mutual relationship between one element or feature and other element(s) or feature (s) as shown in the figures, wherein "above", "below", "upper" and "lower" are relative to the longitudinal axis of the drive shaft, and when facing a corresponding view, the upward direction along the longitudinal axis of the drive shaft is defined as "above" or "upper", and a downward direction along the direction parallel to the axis of the cleaning device is defined as "below" or "lower". When an element is described as "above" or "coupled to" another element, it may be directly above or coupled to another element, or there may be an element between them, whereas when an element is described as "directly above" or "directly coupled to" another element, there is no element between them.

In addition, the term "and/or" used in this application comprises any one or all combinations of one or more listed relevant words.

FIG. 1 to FIG. 10 show a first embodiment of the present invention, which is applicable to the first type of electric cleaning care appliance, namely, the transmission-type electric cleaning care appliance. As shown in FIG. 1 to FIG. 4, the electric cleaning care appliance (e.g., a toothbrush) comprises a cleaning assembly 3 and a handle 1. The handle 1 comprises a handle housing composed of a handle upper shell 101 and a handle lower shell 102. In the handle housing are installed a power source part 180 for supplying power to various parts of the cleaning care appliance, a control part for controlling various working modes of the cleaning care appliance and for controlling the cleaning care appliance, a trigger part for turning on or off the operation of the cleaning care appliance, a drive assembly for converting input electrical energy into a mechanical energy output, and a light sensing part and a detection circuit for detecting an external force Fr applied to a cleaning element 330 (for example, bristles of the electric toothbrush in this embodiment). The cleaning assembly 3 comprises a cleaning assembly housing 310, a cleaning assembly coupling member 320, a cleaning element carrier 331 (for example, a brush disc of the electric toothbrush in this embodiment) and the cleaning element 330. The cleaning assembly 3 is detachably coupled to the handle 1, and in this embodiment, the cleaning assembly coupling member 320 in the cleaning assembly 3 and a drive shaft 190 in the handle 1 are coupled in a non-rotatable manner. The cleaning assembly housing 310 in the cleaning assembly 3 and a brush head interface member 110 in the handle 1 are coupled in a non-rotatable manner. The cleaning assembly 3 may move relative to the drive shaft 190 and the brush head interface member 110 along the longitudinal axis $L_1$ of the drive shaft, so that the cleaning assembly 3 can be detachably coupled to the handle 1. This embodiment only shows a coupling manner in which the cleaning assembly is detachably coupled to the handle. Of course, the present invention is not limited to the coupling manner.

Referring to FIG. 2 to FIG. 5, the drive assembly in this embodiment comprises a micro-motor 161, a gearbox 140, a bottom cover 130 for the brush head interface member, the brush head interface member 110, the drive shaft 190, a gear and linkage mechanism located in the gearbox 140, a gearbox fastening member 120, a motor fastening member 163 and a rotation shaft 112 of the brush head interface member. The micro-motor 161, the gear and linkage mechanism located in the gearbox 140 and the drive shaft 190 are coupled to each other, and the drive shaft 190 is driven by the micro-motor 161 to achieve reciprocating rotation around its longitudinal axis $L_1$ of the drive shaft, thereby driving the cleaning element 330 to rotate to and fro around the rotation axis $L_2$ of the cleaning element carrier 331. The brush head interface member 110, the bottom cover 130 for the brush head interface member and the gearbox 140 are fixedly coupled via the gearbox fastening member 120, the micro-motor 161 and the gearbox 140 are fixedly coupled via the motor fastening member 163, and the rotation shaft 112 of the brush head interface member is coupled to the brush head interface member 110. By a combination of the above structures, the drive assembly may be integrally rotated around the axis $L_3$ of the rotation shaft of the brush head interface member.

Figure 5:
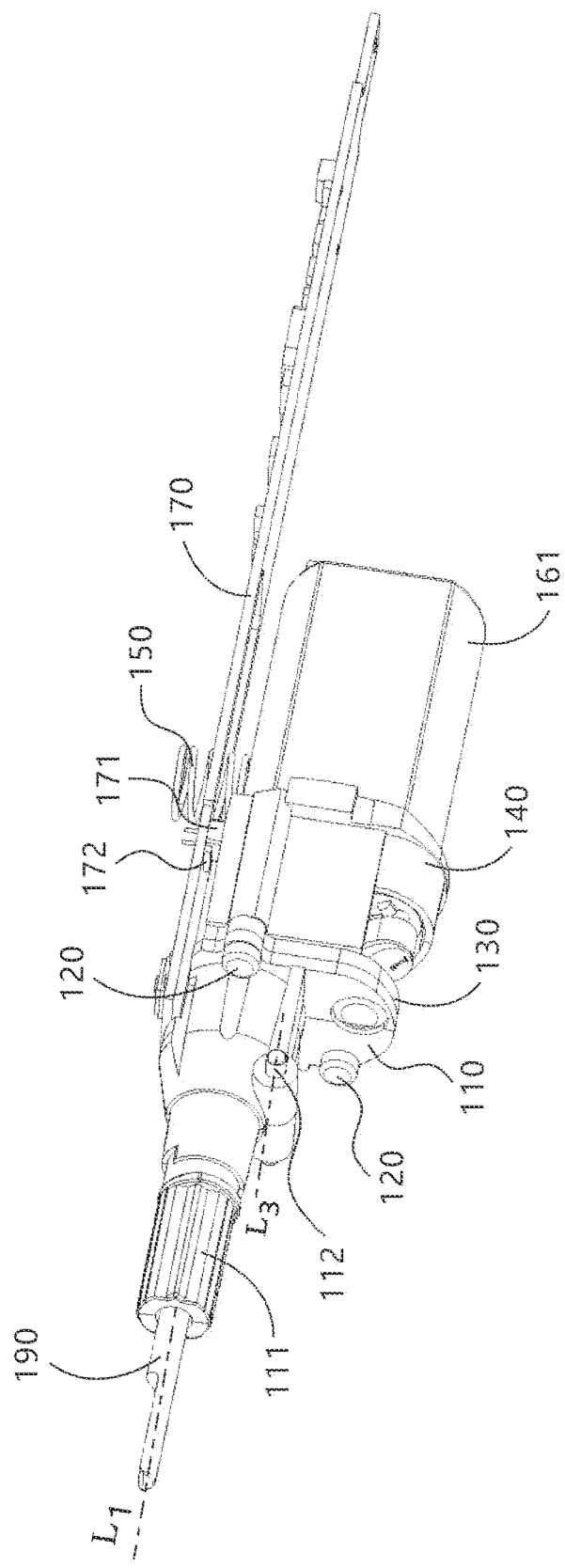
FIG. 5 is a schematic diagram of parts at the middle location inside the handle when no external force is applied to the cleaning element.
Figure 6:
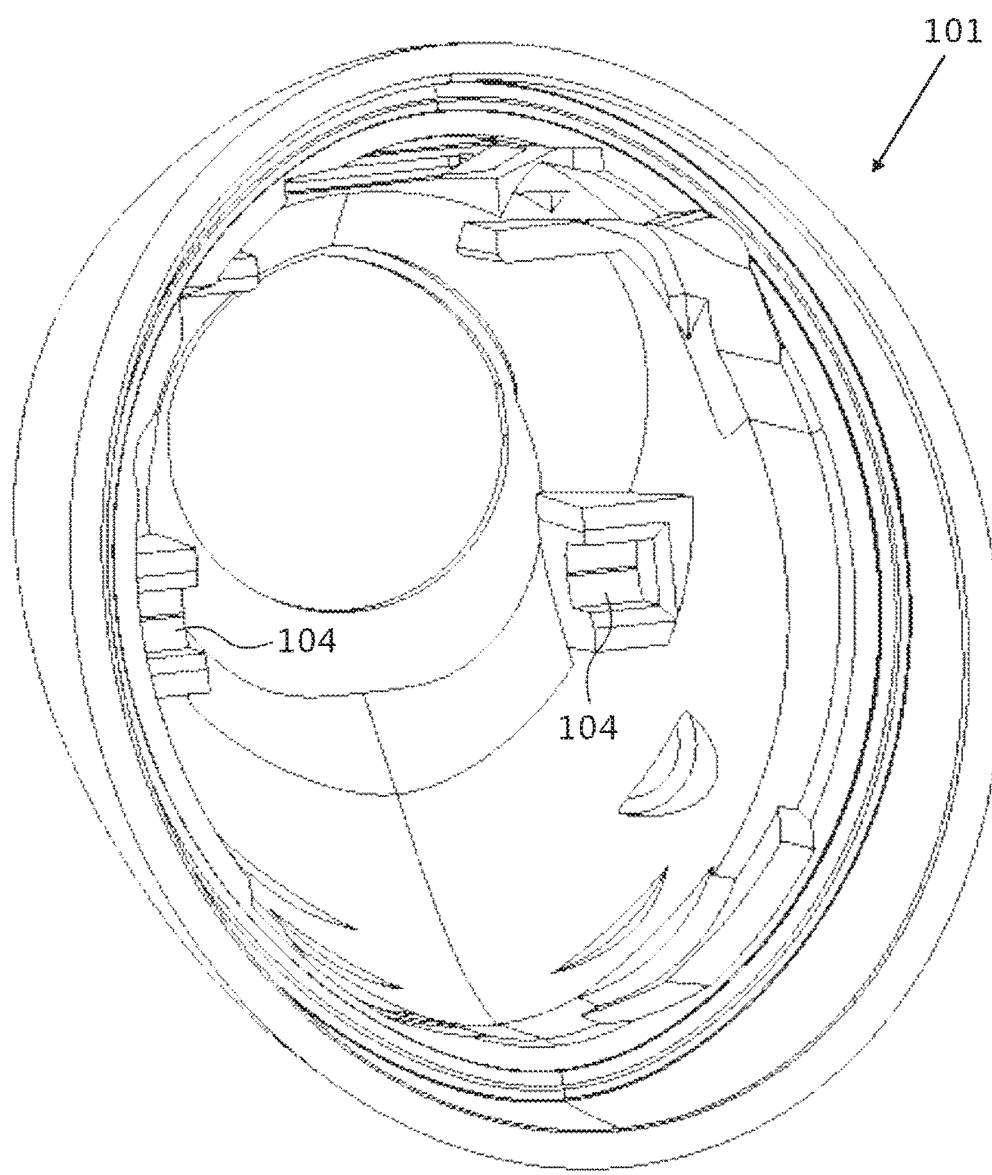
FIG. 6 is a schematic diagram of the handle upper shell.
Figure 7:
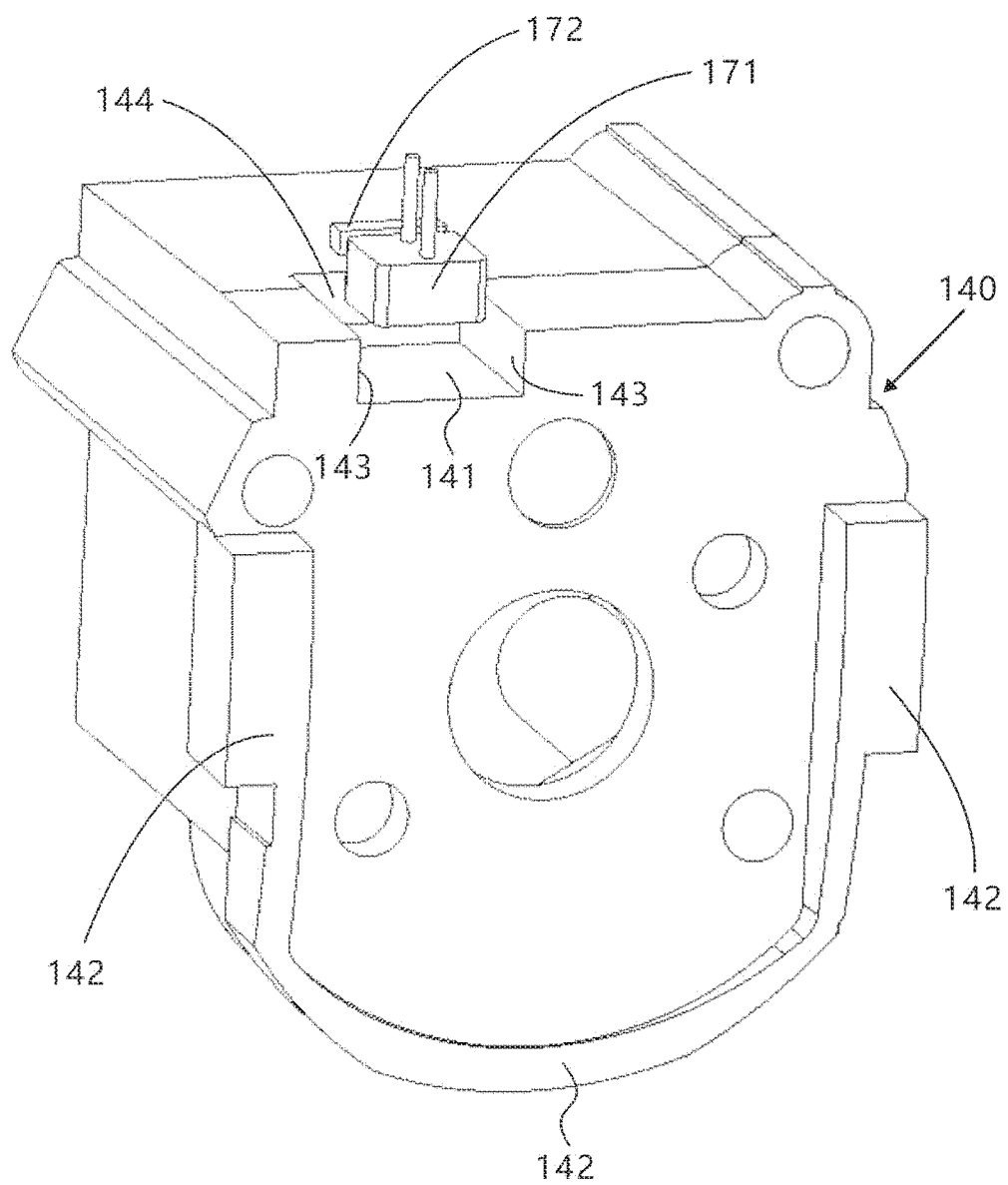
FIG. 7 is a schematic diagram of the gearbox, the light source and the photosensitive unit.
Figure 8:
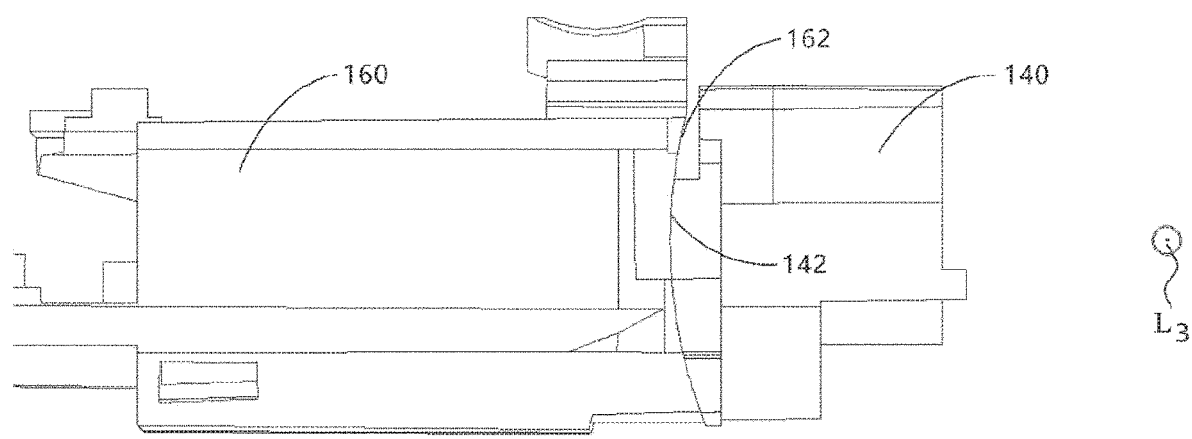
FIG. 8 is a schematic diagram of the gearbox and the motor frame.

According to the present invention, as shown in FIG. 6, in the handle upper shell 101 are provided two recesses 104 on the handle upper shell, for accommodating the rotation shaft 112 of the brush head interface member, and the recesses 104 on the handle upper shell restrict the movement of the rotation shaft 112 of the brush head interface member toward the cleaning element along the longitudinal axis $L_1$ of the drive shaft. A motor frame 160 is fixed in the handle lower shell 102. There is a concave opening at the front end of the motor frame 160 toward the cleaning element along the longitudinal axis $L_1$ of the drive shaft for accommodating the micro-motor 161. The concave opening may accommodate the micro-motor 161 at various positions without interference. As shown in FIG. 7 to FIG. 8, the motor frame 160 comprises a front end surface 162 of the motor frame toward the cleaning element along the longitudinal axis $L_1$ of the drive shaft, and the gearbox 140 comprises a bottom end surface 142 of the gearbox away from the cleaning element along the longitudinal axis $L_1$ of the drive shaft. With reference to FIG. 2 to FIG. 8, the motor frame 160 is fixed in the handle lower shell 102, the front end surface 162 of the motor frame contacts the bottom end surface 142 of the gearbox, and the motor frame 160 supports the gearbox 140 along the direction of the longitudinal axis $L_1$ of the drive shaft. The motor frame 160 restricts the movement of the gearbox 140, the bottom cover 130 for the brush head interface member, the brush head interface member 110, and the rotation shaft 112 of the brush head interface member, etc. away from the cleaning element along the longitudinal axis $L_1$ of the drive shaft, the recesses 104 on the handle upper shell restricts the movement of the rotation shaft 112 of the brush head interface member toward the cleaning element along the longitudinal axis $L_1$ of the drive shaft, whereas the rotation shaft 112 of the brush head interface member, the brush head interface member 110, the bottom cover 130 for the brush head interface member, the gearbox 140 and the micro-motor 161 are fixedly coupled, and there is a gap between the recesses 104 on the handle upper shell and the rotation shaft 112 of the brush head interface member so as to rotate relative to each other. In this embodiment, the front end surface 162 of the motor frame and the bottom end surface 142 of the gearbox are partial cylindrical surfaces with the axis $L_3$ of the rotation shaft of the brush head interface member as its axis, thereby the drive assembly is restricted by the recesses 104 on the handle upper shell and the motor frame 160, the drive assembly may rotate reciprocally around the axis $L_3$ of the rotation shaft of the brush head interface member through the cooperation of the front end surface 162 of the motor frame and the bottom end surface 142 of the gearbox, and moreover, the drive assembly is restrained from moving along the longitudinal axis $L_1$ of the drive shaft, the cleaning assembly 3 is coupled to the drive assembly, and the cleaning assembly 3 may also rotate reciprocally around the axis $L_3$ of the rotation shaft of the brush head interface member.

Figure 3:
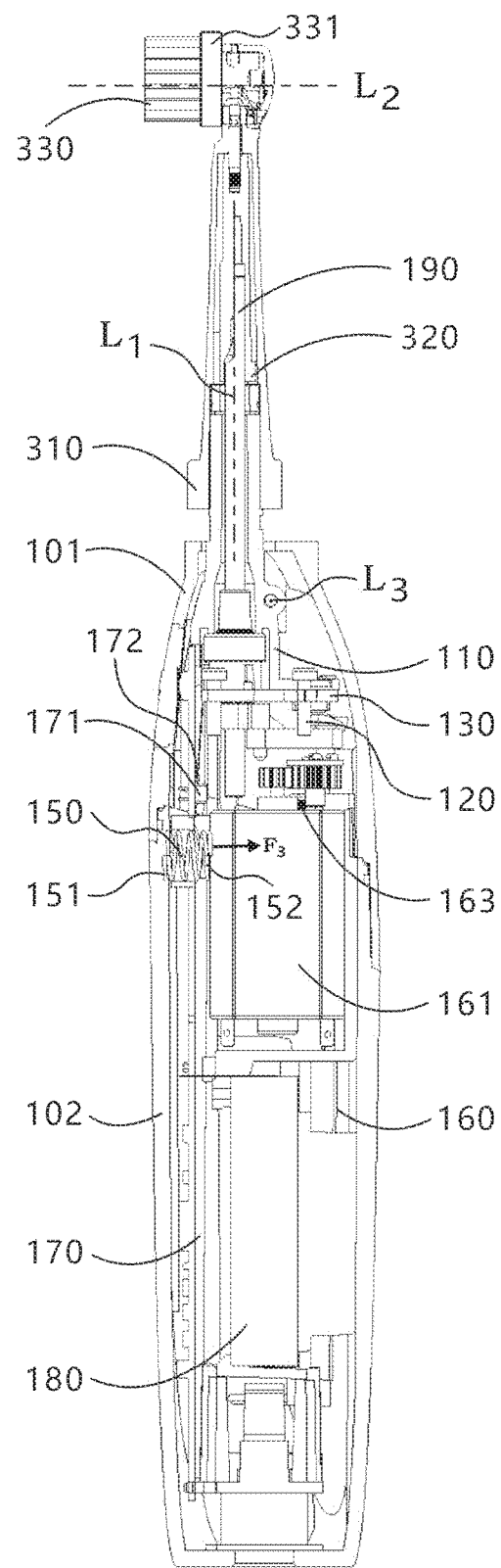
FIG. 3 is a side sectional view of the electric cleaning care appliance when no external force is applied to the cleaning element.
Figure 4:
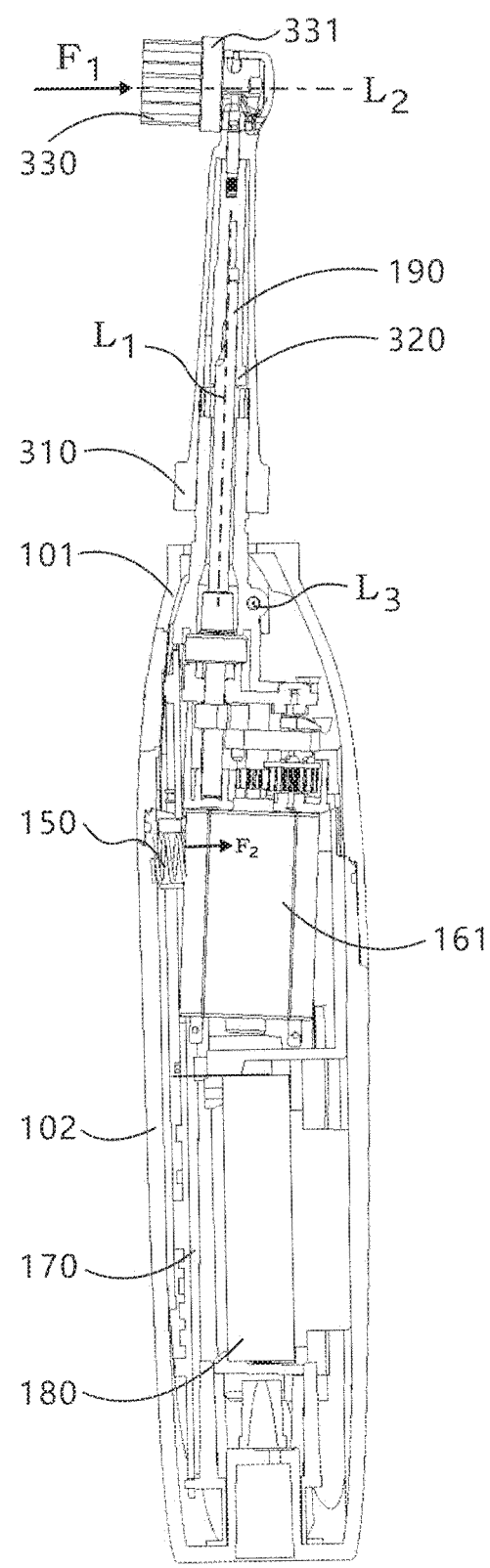
FIG. 4 is a side sectional view of the electric cleaning care appliance when an external force is applied to the cleaning element.

With reference to FIG. 3 to FIG. 5, in the handle 1, in particular, in the handle lower shell 102, is provided an elastic member 150 which plays a reset role, the elastic member 150 may be a spring of any structure, and in this embodiment, the elastic member 150 is a column-type spring. The elastic member 150 passes through the motor frame 160, and the motor frame 160 accommodates part of the elastic member. The elastic-member upper end 151 of the elastic member 150 is coupled to the handle lower shell 102, and the position of the elastic-member upper end 151 of the elastic member 150 is unchanged relative to the handle housing. The elastic-member lower end 152 of the elastic member 150 is coupled to the micro-motor 161, and when the external force $F_1$ is applied to the cleaning element, the micro-motor 161 moves and tends to approach the elastic-member upper end 151, the elastic-member lower end 152 of the elastic member 150 is deformed relative to the handle housing under the action of the external force $F_1$, and the elastic member 150 is in a compressed state or a compression intensified state. When there is no external force acting on the cleaning element 330, the elastic member 150 is in a pre-compressed state, and a pre-tightening force $F_3$ of the elastic member 150 acts on the micro-motor 161, such that the micro-motor 161 and the handle lower shell 102 maintain a relatively fixed position. In this embodiment, assume that when no external force is applied to the cleaning element 330, the elastic member 150 is in a pre-compressed state, the micro-motor 161 is at an initial position, and the drive assembly and the cleaning assembly 3 are also at an initial position. The elastic member 150 resists the action of the external force $F_1$, and the handle housing or a component stationary relative to the handle housing supports and fixes one end of the elastic member 150. Since the handle housing or the component stationary relative to the handle housing is a plastic part, its mechanical strength is too small to withstand a large force, otherwise, the handle housing or the component stationary relative to the handle housing may produce an extra harmful deformation; and additionally, due to the small space, the elastic member is a small-size elastic member and therefore cannot withstand a large force, otherwise, the elastic member is prone to yielding and fatigue. The distance from the action point of the external force $F_1$ to the axis $L_3$ of the rotation shaft of the brush head interface member is called the arm of force of the external force $F_1$, and the distance from the action point of an elastic force generated by the elastic member 150 to the axis $L_3$ of the rotation shaft of the brush head interface member is called the arm of force of the elastic member. After a large number of experiments that the magnitude of the external force $F_1$ and the position of the elastic member affect the lifespan of the elastic member and the deformation of the handle housing, it is confirmed that the above drawback may be avoided if the arm of force of the elastic member is greater than 0.35 times the arm of force of the external force $F_1$. In the present invention, preferably, the arm of force of the elastic member is greater than 0.35 times the arm of force of the external force $F_1$. The pre-tightened state of the elastic member is a pre-compressed state, the elastic member produces a deformation relative to the handle housing under the action of the external force $F_1$, and the elastic member 150 is in a compressed state or a compression intensified state. Clearly, the elastic member may also be provided to rotate 180 degrees around the longitudinal axis $L_1$ of the drive shaft, and at this position, the pre-tightened state of the elastic member is a pre-stretched state, the elastic member produces a deformation relative to the handle housing under the action of the external force $F_1$, and the elastic member 150 is in a stretched state or a stretch intensified state.

Figure 9:
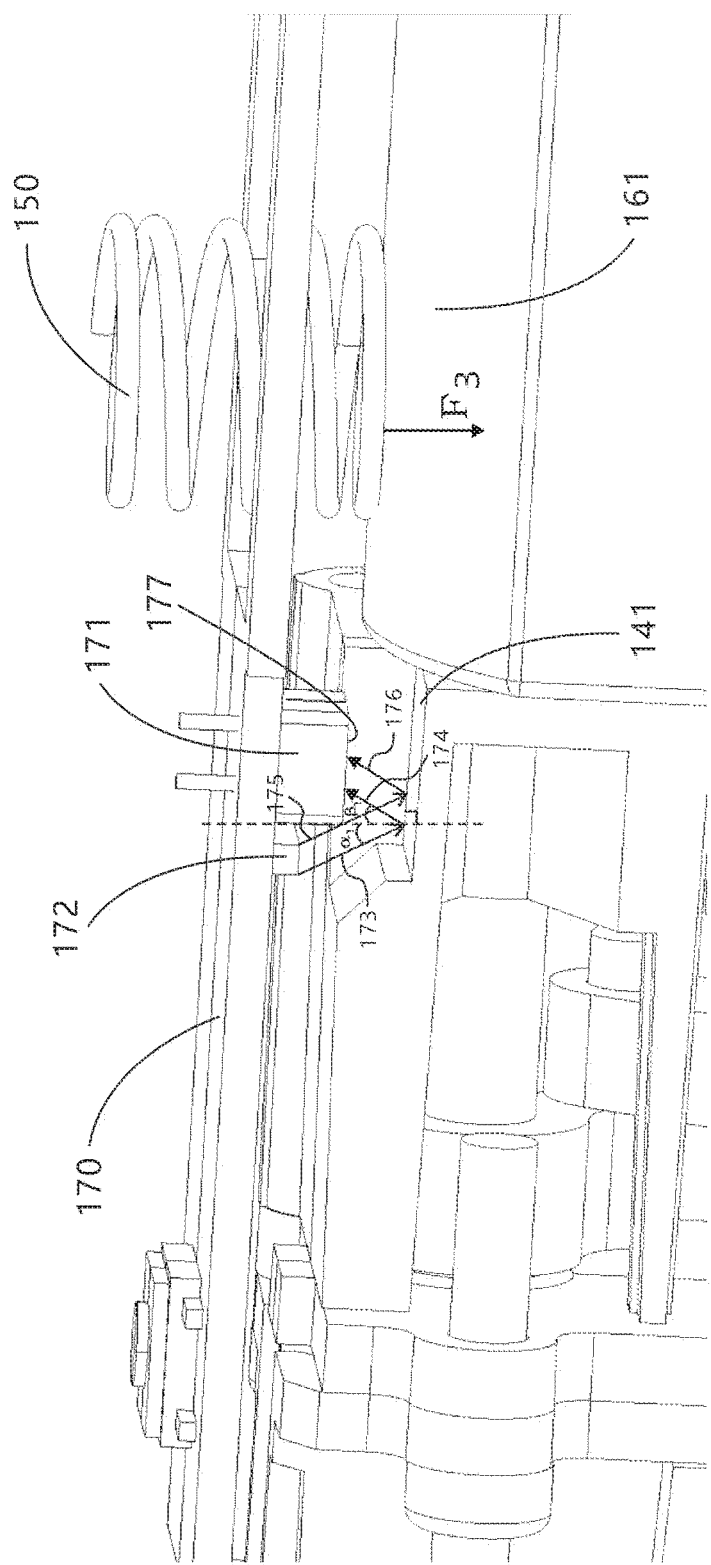
FIG. 9 is a schematic diagram of FIG. 5 from another perspective.
Figure 10:
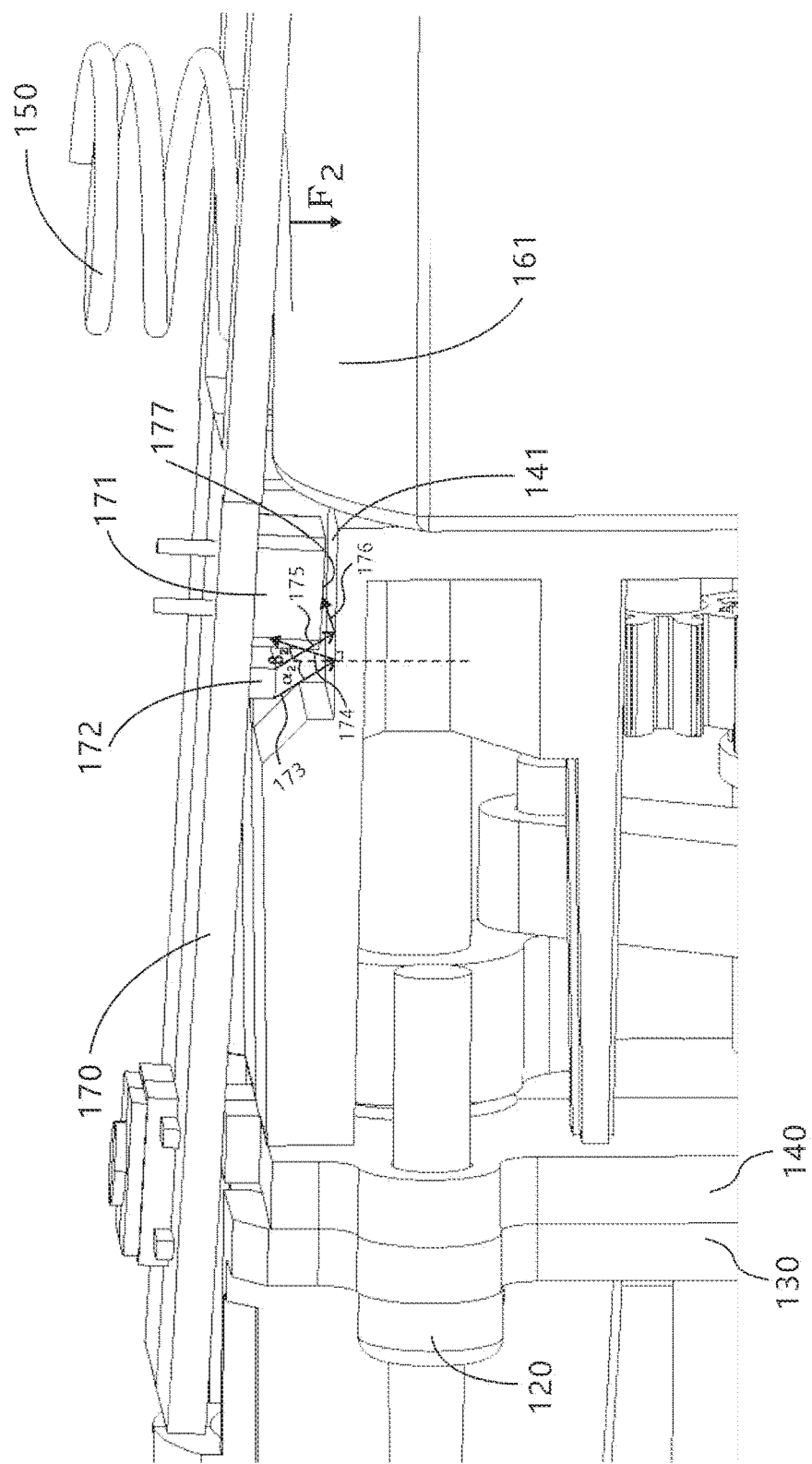
FIG. 10 is a schematic diagram of parts at the middle location inside the handle when an external force is applied to the cleaning element.

The light sensing part comprises a light source 172 and a photosensitive unit 171, and the light emitted by the light source 172 is at least partially reflected and then irradiates the photosensitive unit 171. The light source 172 may be an electronic device actively emitting light, for example, a light emitting diode (LED), and the photosensitive unit 171 may be an electronic device of which the resistance value or the conductivity changes significantly after it is irradiated by light, for example, a photosensitive resistor or a photosensitive diode or a photosensitive triode or the like. As shown in FIG. 9 to FIG. 10, the light source 172 and the photosensitive unit 171 are provided on a side of a circuit board 170 facing the gearbox 140, and the circuit board 170 is fixed on the motor frame 160. The gearbox 140 is provided with a light reflecting surface 141. The light emitted by the light source 172 is at least partially reflected by the light reflecting surface 141 to the photosensitive unit 171. In this embodiment, the photosensitive unit 171 is a photosensitive resistor R. In this specification, the area on a light receiving surface 177 of the photosensitive unit to which the light emitted by the light source 172 is reflected by the light reflecting surface 141 is called a light receiving area of the photosensitive unit, and a light beam of the light emitted by the light source 172 which is reflected by the light reflecting surface 141 to the light receiving surface 177 of the photosensitive unit is called a light-receiving-surface light beam. The light radiation energy per unit time of the light-receiving-surface light beam is the light radiation flux of the light receiving surface. According to electrical characteristics of a photosensitive resistor, the larger the light radiation flux of the light receiving surface on the photosensitive resistor R, the smaller the resistance value of the photosensitive resistor R is. The smaller the light radiation flux of the light receiving surface on the photosensitive resistor R, the larger the resistance value of the photosensitive resistor R is. If the light on the light receiving surface 177 of the photosensitive unit is completely from the light source 172, the change of the resistance value of the photosensitive resistor R is only affected by the light radiation flux of the light receiving surface received on the photosensitive resistor R and from the light source 172. Therefore, in order to increase the sensitivity of change of the resistance value of the photosensitive resistor R with the rotation angle of the gearbox 140 around the axis $L_3$ of the rotation shaft of the brush head interface member as much as possible, that is, to increase the sensitivity of change of the resistance value of the photosensitive resistor R with the external force $F_1$, in this example, a shielding part is provided around the light sensing part. As shown in FIG. 7, the light source 172 is provided next to the photosensitive unit 171, and the gearbox 140 is provided with a gearbox recess. The gearbox recess is constituted by the light reflecting surface 141, a recess side surface 143 of the gearbox and a recess top surface 144 of the gearbox. The recess side surface 143 of the gearbox and the recess top surface 144 of the gearbox constitute a light sensing shielding part. The light reflecting surface 141 roughly directly faces the light source 172 and the photosensitive unit 171, and the recess side surface 143 of the gearbox and the recess top surface 144 of the gearbox are distributed on three sides of the light source 172 and the photosensitive unit 171. There is a motion gap between the light reflecting surface 141 and the light source 172, there is a motion gap between the light reflecting surface 141 and the photosensitive unit 171, there is a motion gap between the recess side surface 143 of the gearbox and the light source 172, there is a motion gap between the recess side surface 143 of the gearbox and the photosensitive unit 171, there is a motion gap between the recess top surface 144 of the gearbox and the light source 172, and there is a motion gap between the recess top surface 144 of the gearbox and the photosensitive unit 171. Preferably, the light source 172 and/or the photosensitive unit 171 partially or completely enters the light sensing shielding part; the light source 172, the photosensitive unit 171 and the light reflecting surface 141 keep a gap with each other, and the gap may be greater than 0.1 mm.

FIG. 3 and FIG. 9 show the states of the light source 172, the photosensitive unit 171 and the gearbox recess when no external force is applied to the cleaning element 330 and the drive assembly is at the initial position. FIG. 4 and FIG. 10 show the states of the light source 172, the photosensitive unit 171 and the gearbox recess when the external force $F_1$ is applied to the cleaning element 330 and the micro-motor 161 is subject to the action of the elastic-member elastic force $F_2$. From the foregoing description of the internal structure of the handle, the internal structure of the cleaning assembly 3 and the coupling mode thereof, the elastic-member pre-tightening force $F_3$ causes the drive assembly to be at the initial position when no external force is applied to the cleaning element 330. FIG. 9 schematically shows a situation in which the light rays 173, 175 emitted by the light source 172 are reflected by the light reflecting surface 141 to form the reflected light rays 174, 176 and irradiate the light receiving surface 177 of the photosensitive unit. As described above, in the present invention, the light source 172 and the photosensitive unit 171 may be any component that may stably emit light and any component sensitive to light. For example, the photosensitive unit 171 may be a photosensitive resistor R, and the light source 172 may be an LED. Suppose that after the photosensitive resistor 171 receives light from the light source 172, the corresponding resistance value of the photosensitive resistor 171 is $R_0$, and $R_0$ is called a corresponding initial photosensitive resistance value of the photosensitive resistor 171 when the drive assembly is in the initial position. With respect to the light path in which the light ray 173 emitted by the light source 172 is reflected by the light reflecting surface 141 to the photosensitive unit 171, the incident angle and the reflection angle of the light ray 173 emitted by the light source 172 on the light reflecting surface 141 are $\alpha 1$ and $\beta 1$, respectively, $\alpha 1$ is called a reflecting-surface initial incident angle, $\beta 1$ is called a reflecting-surface initial reflection angle, the light receiving area on a light receiving surface 177 of the photosensitive unit to which the light emitted by the light source 172 is reflected by the light reflecting surface 141 is called an initial light-receiving area of the photosensitive unit, a light beam of the light emitted by the light source 172 which is reflected by the light reflecting surface 141 to the light receiving surface 177 of the photosensitive unit is called an initial light-receiving-surface light beam, and the light radiation energy per unit time of the initial light-receiving-surface light beam is called the initial light-receiving-surface light radiation flux.

From the foregoing description of the internal structure of the handle, the internal structure of the cleaning assembly 3 and the coupling mode thereof and with reference to FIG. 4, when the external force $F_1$ is applied to the cleaning element 330, the drive assembly and the cleaning assembly 3 rotate clockwise around the axis $L_3$ of the rotation shaft of the brush head interface member, the elastic member 150 is further compressed, and the elastic member 150 produces the elastic-member elastic force $F_2$ to resist the clockwise rotation of the drive assembly. When the moment formed by the elastic-member elastic force $F_2$ with respect to the axis $L_3$ of the rotation shaft of the brush head interface member and the moment formed by the external force $F_1$ with respect to the axis $L_3$ of the rotation shaft of the brush head interface member are of the same magnitude and opposite directions, the drive assembly and the cleaning assembly 3 are in a balanced position, which is called a in-process position of the drive assembly. As shown in FIG. 10, comparing a condition under the combined action of the external force $F_1$ and the elastic-member elastic force $F_2$, and a condition in which there is no external force on the cleaning element 330 and the elastic member 150 only produces the elastic-member pre-tightening force $F_3$, the light reflecting surface 141 of the latter is closer to the photosensitive resistor R, and the reflected light rays of the light rays 173, 175 emitted by the light source 171 which are reflected by the light reflecting surface 141 to the photosensitive unit 172 are 174, 176. If suppose that after the photosensitive resistor R receives light from the light source 172, the corresponding resistance value of the photosensitive resistor R is $R_1$, $R_1$ is called a corresponding in-process photosensitive resistance value of the photosensitive resistor R when the drive assembly is in a in-process position of the drive assembly. As shown in FIG. 10, with respect to the light path in which the light ray 173 emitted by the light source 172 is reflected by the light reflecting surface 141 to the photosensitive unit 171, the incident angle and the reflection angle of the light ray 173 emitted by the light source 172 on the light reflecting surface 141 are $\alpha 2$ and $\beta 2$, respectively, $\alpha 2$ is a reflecting-surface in-process incident angle, $\beta 2$ is a reflecting-surface in-process reflection angle, the light receiving area on the light receiving surface 177 of the photosensitive unit to which the light emitted by the light source 172 is reflected by the light reflecting surface 141 is an in-process light-receiving area of the photosensitive unit, and a light beam of the light emitted by the light source 172 which is reflected by the light reflecting surface 141 to the light receiving surface 177 of the photosensitive unit is an in-process light-receiving-surface light beam, and the light radiation energy per unit time of the in-process light-receiving-surface light beam is the in-process light-receiving-surface light radiation flux. According to characteristics of a photosensitive resistor, the larger the light radiation flux of the light receiving surface on the photosensitive resistor R, the less the resistance value of the photosensitive resistor R is. FIG. 10 shows a situation in which the drive assembly is at an in-process position. FIG. 9 shows a situation in which the drive assembly is at the initial position. Comparing FIG. 9 with FIG. 10, that is, comparing the drive assembly being at the initial position with it being at an in-process position, the reflecting-surface initial incident angle $\alpha 1$ and the reflecting-surface initial reflection angle $\beta 1$ are greater than the reflecting-surface in-process incident angle $\alpha 2$ and the reflecting-surface in-process reflection angle $\beta 2$, respectively, and thereby the initial light-receiving area of the photosensitive unit is greater than the in-process light-receiving area of the photosensitive unit. In this example, the light source is a stable light-emitting unit, the voltage on the light source is a stable voltage, the current flowing through the light source keeps unchanged, and the light emitted by the light source has a stable light radiation flux. The initial light-receiving area of the photosensitive unit is large, and the light radiation received by the photosensitive unit and emitted by the light source is large. The in-process light-receiving area of the photosensitive unit is small, and the light radiation received by the photosensitive unit and emitted by the light source is small. Accordingly, the initial photosensitive resistance value $R_0$ is smaller than the in-process photosensitive resistance value $R_1$.

Figure 11:
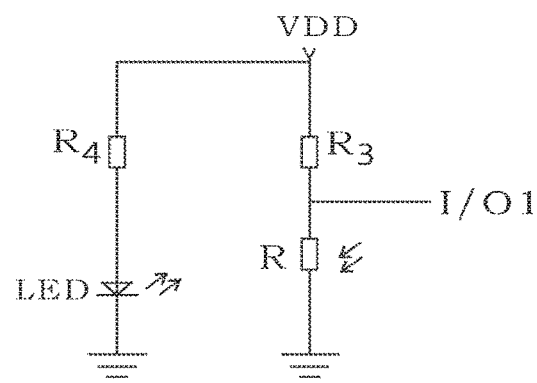
FIG. 11 is a detection circuit for the voltage value of the photosensitive unit.

FIG. 11 shows a detection circuit for detecting the change of a detected voltage resulting from the change of the photosensitive resistance value. An upper limit of the external force $F_1$ on the cleaning element 330 is set. If the external force F1 is greater than or equal to the upper limit, the electric cleaning care appliance may output information of the pressure being too large by way of sound and/or light and/or vibration, etc. The upper limit is called an alarm force threshold. With reference to FIG. 11, $V_{DD}$ is a voltage source with a stable voltage value. The external force $F_1$ is applied to the cleaning element 330 incrementally unidirectionally from zero with 20 grams of force as a step until a preset alarm force threshold. Since $V_{DD}$ is a stable voltage, $R_3$ is a fixed resistor, and the resistance value of the photosensitive resistor R changes with the change of the external force $F_1$, I/O1 may collect corresponding voltage values on the photosensitive resistor R under different external forces $F_1$, and store the different external forces $F_1$ and the corresponding voltage values on the photosensitive resistor R in an MCU. The MCU may pre-store a correspondence relationship between different voltage values on the photosensitive resistor R and different external forces $F_1$. When a user applies a different external force $F_1$ to the cleaning element 330 using an electric toothbrush, I/O1 detects a corresponding voltage value on the photosensitive resistor R, the MCU may calculate the external force $F_1$ exerted by the current user according to a pre-stored pressure and voltage value table, thereby the MCU may display the external force $F_1$ exerted by the user, and when the external force $F_1$ exerted by the user on the cleaning element 330 reaches or exceeds the alarm force threshold, the alarm part may also indicate that the pressure is too large by way of sound and/or light and/or vibration, etc.

The present invention inventively reflects the light of the light source to the photosensitive unit 171 via the reflecting surface provided on the drive assembly movable relative to the handle housing, the combined action of the applied external force $F_1$ and the elastic-member elastic force $F_2$ causes the drive assembly to generate movement relative to the handle upper shell 101 and the handle lower shell 102, the movement of the drive assembly causes the incident angle and the reflection angle of the light emitted by the light source 172 on the light reflecting surface 141 to change, thereby causing the light receiving area of the photosensitive unit capable of receiving the light from the light source 172 to change and leading to corresponding change of the electrical performance of the photosensitive unit 171, in particular, leading to change of the resistance value of the photosensitive resistor R, and in turn, the voltage change of the photosensitive resistor R may be detected at the I/O1 port of the MCU, thereby implementing recognition of the external force $F_1$, and the alarm part may issue sound amid/or light and/or vibration reminder information when the external force $F_1$ exceeds or reaches the alarm force threshold.

In the first embodiment, the light source 172 and the photosensitive unit 171 are fixed on the circuit board 170, the light emitted by the light source 172 is reflected by the light reflecting surface 141 of the gearbox recess to the photosensitive unit 171, and the light reflecting surface 141 may be rotated to and fro around the axis $L_3$ of the rotation shaft of the brush head interface member under the combined action of the external force $F_1$ and the elastic-member elastic force $F_2$.

Figure 12A:
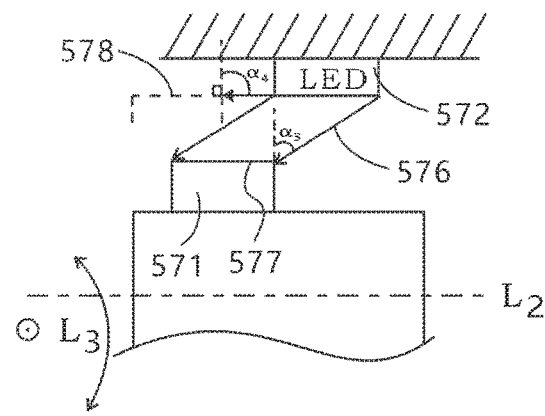
FIG. 12a, FIG. 12b and FIG. 12c are schematic diagrams of different configurations of the photosensitive unit and the light source in the light sensing part, respectively.
Figure 12B:
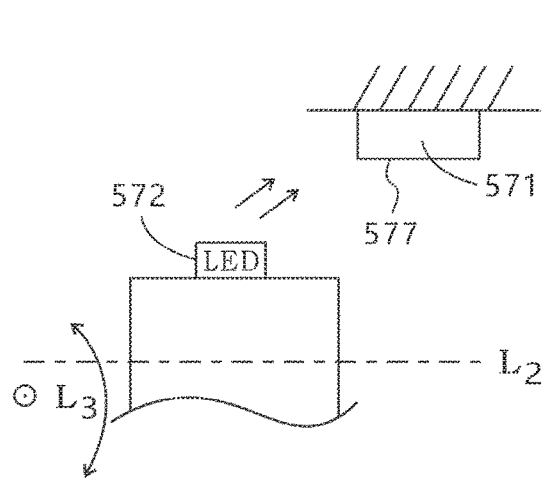

FIG. 12a to FIG. 12b shows a second embodiment of the present invention applicable to the transmission-type cleaning care appliances. Here, a component in the handle 1 which is fixed relative to the handle lower shell 102 is defined as a stationary component; and a component in the handle 1 which is movable relative to the handle lower shell 102 is defined as a movable component. As shown in FIG. 12a, a light source 572 is provided on the circuit board 170 which is stationary relative to the handle lower shell 102, and a photosensitive unit 571 is provided on a movable component which is movable relative to the handle lower shell 102 under the combined action of the external force $F_1$ and the elastic-member elastic force $F_2$. In FIG. 12b, the photosensitive unit 571 is provided on the circuit board 170 which is stationary relative to the handle lower shell 102, the light source 572 is provided on a movable component which is movable relative to the handle lower shell 102 under the combined action of the external force $F_1$ and the elastic-member elastic force $F_2$, and the light emitted by the light source 572 directly irradiates the photosensitive unit 571. FIG. 12a and FIG. 12b work similarly, and in the following, FIG. 12a is taken as an example for analysis.

As shown in FIG. 12a, the light source 572 is provided on the circuit board 170 which is stationary relative to the handle lower shell 102, and the photosensitive unit 571 is provided on a movable component which is movable relative to the handle lower shell 102 under the combined action of the external force $F_1$ and the elastic-member elastic force $F_2$. The reference sign 577 indicates an initial light-receiving surface of the photosensitive unit when no external force is applied to the cleaning element 330 and the photosensitive unit 571 receives light, and the reference sign 578 indicates an in-process light-receiving surface of the photosensitive unit after the photosensitive unit 571 rotates around the axis $L_3$ of the rotation shaft of the brush head interface member under the combined action of the external force $F_1$ and the elastic-member elastic force $F_2$. The initial light-receiving surface 577 of the photosensitive unit is lower than the light source 572, and the light 576 emitted by the light source 572 directly irradiates the initial light-receiving surface 577 of the photosensitive unit. The in-process light-receiving surface 578 of the photosensitive unit is closer to the light source 572, and the light 576 emitted by the light source 572 cannot directly irradiate the in-process light-receiving surface 578 of the photosensitive unit. The incident angle of the light 576 emitted by the light source 572 on the initial light-receiving surface 577 of the photosensitive unit is an initial light-receiving-surface incident angle $\alpha 3$, the incident angle of the light 576 emitted by the light source 572 on the in-process light-receiving surface 578 of the photosensitive unit is an in-process light-receiving-surface incident angle $\alpha 4$, and the in-process light-receiving-surface incident angle $\alpha 4$ is greater than the initial light-receiving-surface incident angle $\alpha 3$. Clearly, the movement of the movable component causes the incident angle of the light ray 576 emitted by the light source 572 on the light receiving surface of the photosensitive unit to change, and thereby causes the light receiving area of the photosensitive unit which can receive the light 576 from the light source 572 to change. In particular, the light receiving area on the initial light-receiving surface 577 of the photosensitive unit is greater than the light receiving area on the in-process light-receiving surface 578 of the photosensitive unit. In the present invention, the light source 572 is a stable light source, the light emitted by the light source 572 has a stable light radiation flux, and thereby the light radiation received by the relatively large initial light-receiving surface 577 of the photosensitive unit is greater than the light radiation received by the relatively small in-process light-receiving surface 578 of the photosensitive unit. Therefore, the resistance value of the photosensitive resistor corresponding to the in-process light-receiving surface 578 of the photosensitive unit is much greater than the resistance value of the photosensitive resistor corresponding to the initial light-receiving surface 577 of the photosensitive unit, and thereby the change of the external force $F_1$ may be reflected by the change of the voltage value on the photosensitive resistor.

Obviously FIG. 12a is just an example, and there may further be many variations. For example, the in-process light-receiving surface 578 of the photosensitive unit is far away from the light source 572 as compared to the initial light-receiving surface of the photosensitive unit, and the like.

Figure 12C:
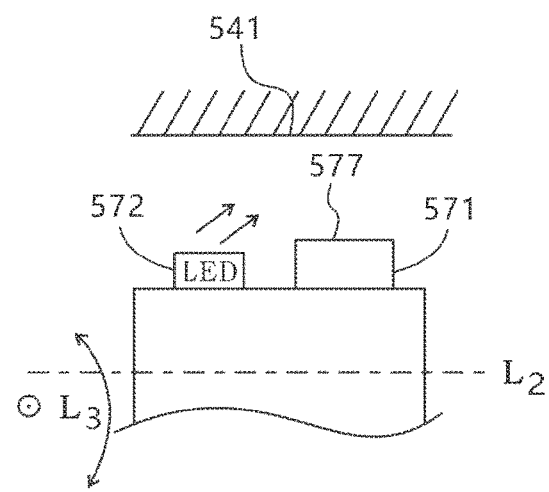

FIG. 12c shows a third embodiment of the present invention, which is also applicable to the first type of electric cleaning care appliance, namely, the transmission-type electric cleaning care appliance. Different from the embodiment as shown in FIGS. 1-10, the light source 572 and the photosensitive unit 571 are provided on the movable driver assembly, and the light reflecting surface 241 is provided on the circuit board which is stationary relative to the handle housing. The light source 572 and the photosensitive unit 571 may move relative to the handle lower shell 102 under the combined action of the external force $F_1$ and the elastic-member elastic force $F_2$, and the light emitted by the light source 572 is reflected to the photosensitive unit 571 by the circuit board or other stationary components which is stationary relative to the handle lower shell 102.

The analysis of the working state of FIG. 12c is similar to the first embodiment, and will not be repeated here any longer.

As shown in FIGS. 1-10 and FIG. 12c, the light source 172, 572 and the photosensitive unit 171, 571 are provided on a same side and provided on a movable component or a stationary component simultaneously, on the photosensitive unit 171, 571 is provided the light receiving surface 177 (FIG. 9) or 577 (FIG. 12c) of the photosensitive unit, the light reflecting surfaces 141, 541 are provided on the stationary component (e.g., the circuit board) or the movable component facing the side on which the light source 172, 572 and the photosensitive unit 171, 571 are provided, the light reflecting surface 141, 541 may reflect the light emitted by the light source 172, 572 to the photosensitive unit 171, 571, and the movable component may move relative to the handle lower shell 102 under the combined action of the external force $F_1$ and the elastic-member elastic force $F_2$. the present invention inventively provides the photosensitive unit and the light source on a movable component or a stationary component simultaneously and on the same side, and provides the light reflecting surface 141, 541 on a stationary component (e.g., the circuit board) or a movable component facing the side on which the light source 172, 572 and the photosensitive unit 171, 571 are provided, and when the external force $F_1$ is incremented unidirectionally from zero, the distance from the light source and/or the light receiving surface of the photosensitive unit to the light reflecting surface changes unidirectionally, thereby resulting in the change of the voltage value of the photosensitive resistor.

As shown in FIG. 12a to FIG. 12b (the second embodiment), the light source 572 and the photosensitive unit 571 are distributed on a movable component or a stationary component, respectively, and the light emitted by the light source 572 directly irradiates the light receiving surface of the photosensitive unit. In this embodiment, the light receiving surface of the photosensitive unit located on the movable component when there is no external force on the cleaning element 330 is called an initial light-receiving surface of the photosensitive unit; and the light receiving surface of the photosensitive unit located on the movable component under the combined action of the external force $F_1$ and the elastic-member elastic force $F_2$ is called an in-process light-receiving surface of the photosensitive unit. According to the present invention, it may be possible to provide the light receiving surface of the photosensitive unit on a movable component and provide the light source 572 on a stationary component, and when the external force $F_1$ is increased unidirectionally from zero, the in-process light-receiving surface 578 of the photosensitive unit approaches the light source unidirectionally or even crosses the light source from the initial light-receiving surface 577 of the photosensitive unit, or moves away from the light source unidirectionally from the initial light-receiving surface 577 of the photosensitive unit; or it may be possible to provide the light source 572 on a movable component and provide the light receiving surface of the photosensitive unit on a stationary component, the light emitted by the light source directly irradiates the light-receiving surface of the photosensitive unit, and when the external force $F_1$ is increased unidirectionally from zero, the light source 572 approaches the light-receiving surface of the photosensitive unit unidirectionally or even crosses the light-receiving surface of the photosensitive unit, or moves away from the light-receiving surface of the photosensitive unit unidirectionally.

In the present invention, since the current path of the circuit of the light sensing part is separated from that of the power device (e.g., a miniature DC motor), and only the external force $F_1$ can cause the movable component to move relative to the handle housing, interference of the power device on the electrical signal of the light sensing part in the detection circuit may be effectively avoided, and since a force (e.g., the friction between the bristles and the tooth surface in an electric toothbrush) perpendicular to the direction of the external force $F_1$ cannot cause the movable component to move, the device may accurately identify the external force $F_1$, improves the identification of the pressure and in turn increases the accuracy of pressure detection and alarms.

In an existing electric cleaning care appliance of the resonance oscillation type, its power unit comprises a drive coil (a motor stator part) and a spring assembly driven by the drive coil, and in the spring assembly is provided a magnet. The direction of magnetic field lines inside the magnet is roughly parallel to that of the magnetic field lines generated by the drive coil, and the magnet directly faces the drive coil, to achieve that electromagnetic energy is converted to mechanical energy more efficiently. The electromagnetic force generated by the magnet in response to the AC current of the drive coil drives the spring assembly to move. To achieve pressure alarms, under the action of the external force applied to the cleaning element, people often want that the magnet has a sufficiently large displacement in a direction perpendicular to the magnetic field lines inside the magnet but the drive coil itself does not move with the action of the external force. Therefore, under the action of the external force applied to the cleaning element, the angle between the direction of the magnetic field lines inside the magnet and the direction of the magnetic field lines generated by the drive coil will increase with the increase of external force, and thereby it is possible to reduce the efficiency of converting electromagnetic energy to mechanical energy and form additional electromagnetic harmonics, additional harmonic noise and vibration on the handle housing.

Figure 13:
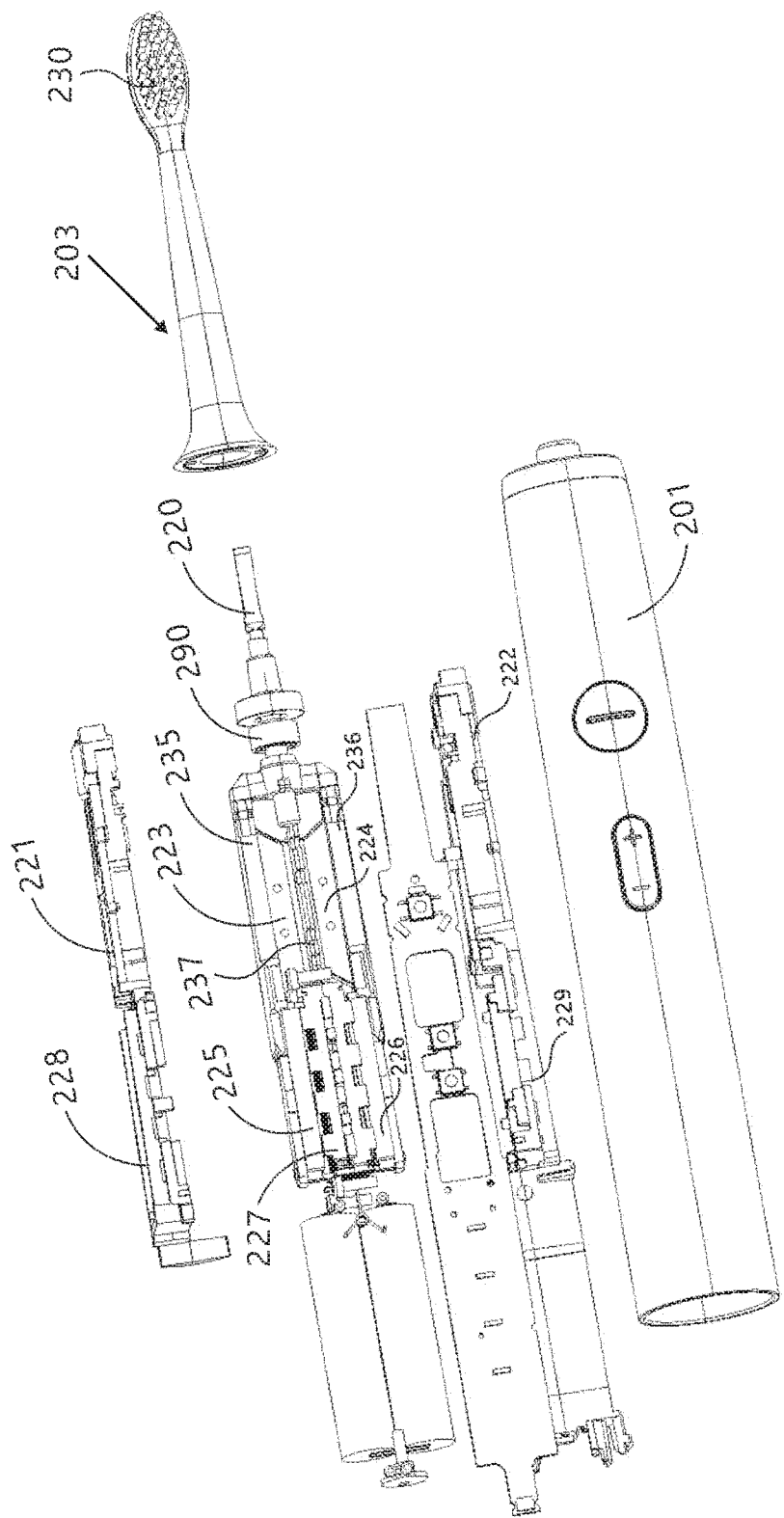
FIG. 13 is an exploded schematic diagram of the second type of the electric cleaning care appliance.
Figure 14:
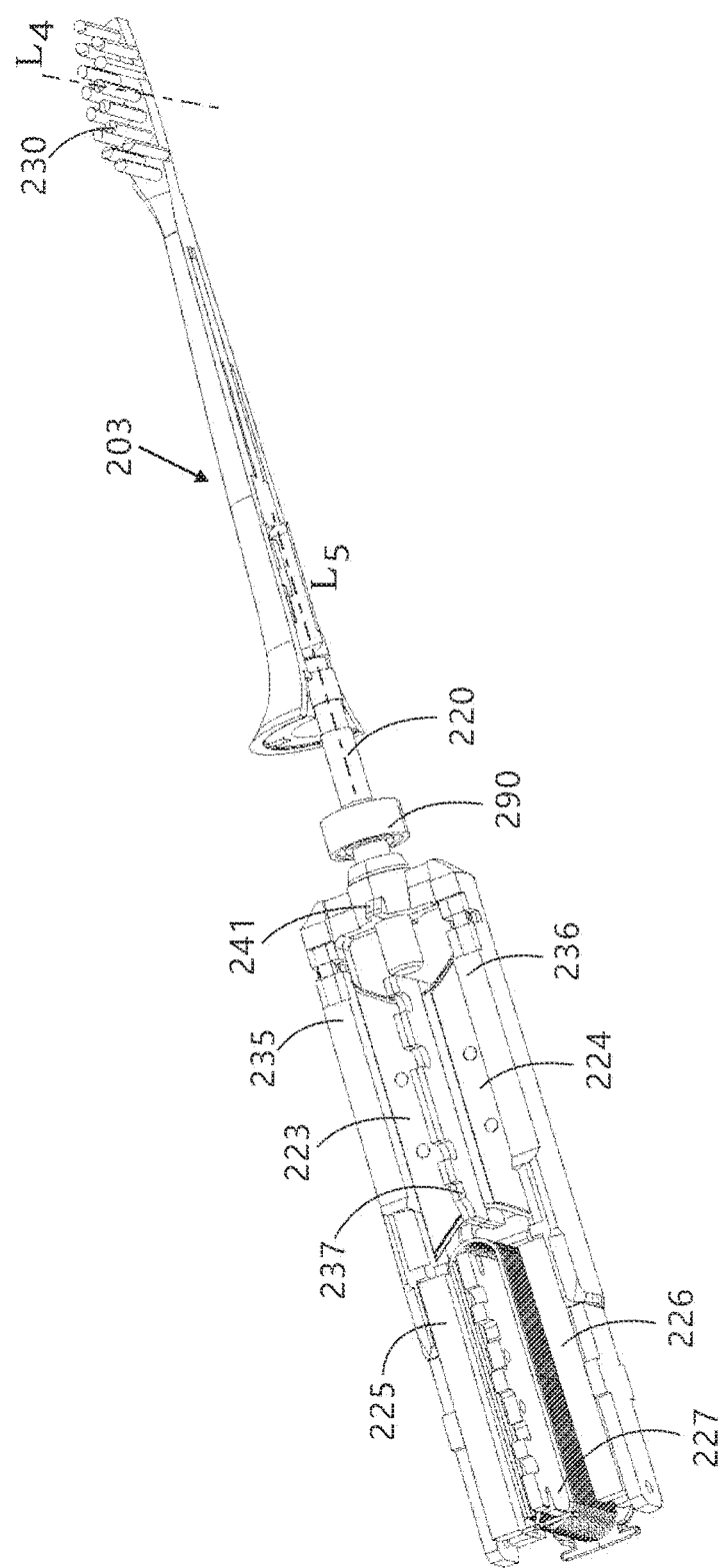
FIG. 14 and FIG. 15 are schematic diagrams of combinations of some parts in the second type of the electric cleaning care appliance.
Figure 15:
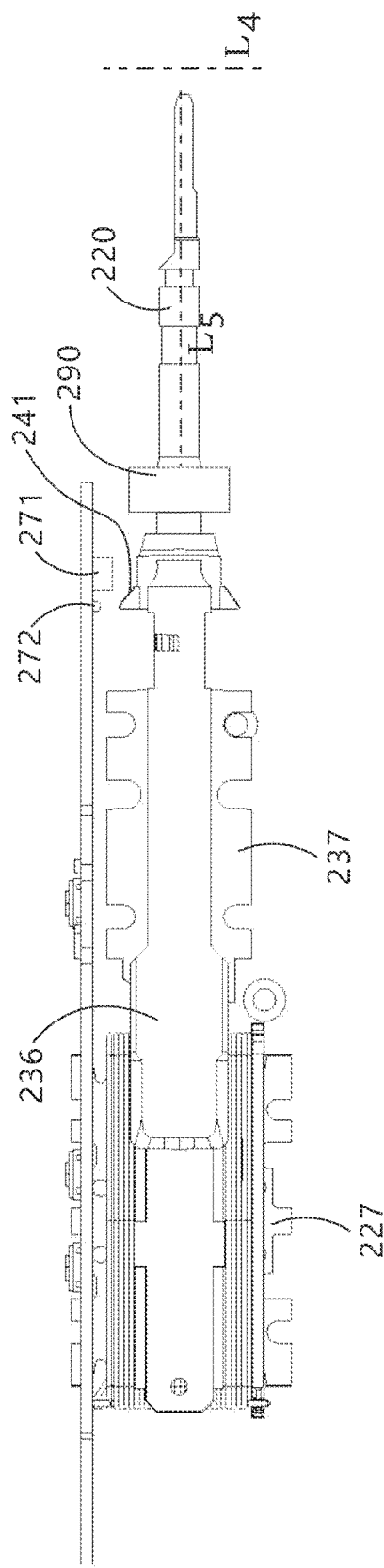

In the present invention, as shown in a fourth embodiment (which is applicable to the second type of electric cleaning care appliance, namely, applicable to the electric cleaning care appliances of the resonance oscillation type) shown in FIG. 13 to FIG. 15, a cleaning assembly 203 is detachably coupled to a drive shaft 220, and the cleaning assembly 203 is not rotatable relative to the drive shaft 220. The cleaning assembly 203 is provided with a cleaning element 230, the axis along the length direction of the cleaning element 230 is $L_4$, a ball bearing 290 is provided in the direction of the drive shaft 220 away from the cleaning element 230, the ball bearing 290 is fixed by driver brackets 221, 222, the driver brackets 221, 222 are fixed by a handle housing 201, the drive shaft 220 is fixedly coupled to transducer drive arms 235, 236 in a direction away from the ball bearing 290 along the longitudinal axis $L_5$ of the drive shaft, the two transducer drive arms 235, 236 are symmetrically distributed along the longitudinal axis $L_5$ of the drive shaft, the upper ends of the two transducer drive arms close to the cleaning element 230 are fixedly coupled to elastic members 223, 224, respectively, the other ends of the elastic members 223, 224 are fixedly coupled to an elastic-member fixing member 237, the elastic members 223, 224 are symmetrically distributed along the longitudinal axis $L_5$ of the drive shaft, the elastic-member fixing member 237 is fastened by the driver brackets 221, 222, and the driver brackets 221, 222 are fastened by the handle housing 201. The elastic members 223, 224 are sheet-shaped members, the direction along an elastic member 223, 224 from the elastic-member fixing member 237 toward a corresponding transducer drive arm 235, 236 is a length direction of the elastic member, the direction along an elastic member 223, 224 parallel to the longitudinal axis $L_5$ of the drive shaft is a width direction of the elastic member, and the other direction of the elastic member 223, 224 is a thickness direction of the elastic member. The length direction of the elastic member 223, 224 and the thickness direction of the elastic member are perpendicular to the longitudinal axis $L_5$ of the drive shaft. Below the two transducer drive arms 235, 236 away from the cleaning element 230 are provided two permanent magnets 225, 226 with opposite internal magnetic field line directions, respectively, between the two permanent magnets 225, 226 is provided a drive coil 227, the internal magnetic field line directions of the permanent magnets 225, 226 are approximately perpendicular to the direction of the internal magnetic field line generated by the drive coil 227, the internal magnetic field lines generated by the drive coil 227 are perpendicular to the longitudinal axis $L_5$ of the drive shaft, and the internal magnetic field lines of the permanent magnets 225, 226 are perpendicular to the longitudinal axis $L_5$ of the drive shaft. The internal magnetic field line directions of the permanent magnets 225, 226 are approximately parallel to the length direction of the elastic member. The drive coil 227 is fastened by drive coil brackets 228, 229, and the drive coil brackets 228, 229 are fastened by the handle housing 201. When an AC current passes the drive coil 227, the permanent magnets 225, 226 are subject to an alternating electromagnetic force and drive the drive shaft 220 to rotate to and fro around the longitudinal axis $L_5$ of the drive shaft, the drive shaft 220 drives the cleaning assembly 203 to rotate to and fro around the longitudinal axis $L_5$ of the drive shaft, and the alternating electromagnetic force to which the permanent magnets 225, 226 are subject is approximately parallel to an external force applied to the cleaning element 230 along the axis $L_4$ along the length direction of the cleaning element. In combination with the above appropriate elastic-member structures, in which both the length and the width of an elastic member 223, 224 are equal to or greater than 5 times the thickness of the elastic member, an elastic-member stiffness coefficient of the elastic member 223, 224 in a direction perpendicular to the longitudinal axis $L_5$ of the drive shaft and perpendicular to the length direction of the elastic member is far less than an elastic-member stiffness coefficient of the elastic member along the direction of the longitudinal axis $L_5$ of the drive shaft, and the elastic-member stiffness coefficient of the elastic member 223, 224 in the direction perpendicular to the longitudinal axis $L_5$ of the drive shaft and perpendicular to the length direction of the elastic member is far less than an elastic-member stiffness coefficient of the elastic member along the length direction of the elastic member. The alternating electromagnetic force from the drive coil and acting on the permanent magnets 225, 226 is approximately parallel to the thickness direction of the elastic member and to an external force applied to the cleaning element 230 along the axis $L_4$ along the length direction of the cleaning element. An elastic-member stiffness coefficient of an elastic member 223, 224 in a direction along or parallel to the axis $L_4$ along the length direction of the cleaning element is far less than that of the elastic member along a direction perpendicular to the axis $L_4$ along the length direction of the cleaning element 230, and said "far less than" means equal to or less than 1/10. In this embodiment, the drive shaft 220, the transducer drive arms 235, 236, and the permanent magnets 225, 226 constitute a movable component. Under the combined action of the external force along the axis $L_4$ along the length direction of the cleaning element 230 and an elastic-member elastic force, the movable component moves relative to the handle housing 201. In particular, with the ball bearing center as a fulcrum, the movable component moves around the direction of a moment formed by the external force taking the ball bearing center as a fulcrum. In this embodiment, the following is cleverly utilized: a structure in which the elastic members 223, 224 are symmetrically distributed along the longitudinal axis $L_5$ of the drive shaft; a characteristic that an elastic-member stiffness coefficient of the elastic member 223, 224 in a direction perpendicular to the longitudinal axis $L_5$ of the drive shaft and perpendicular to the length direction of the elastic member is far less than a stiffness coefficient of the elastic member along the direction of the longitudinal axis $L_5$ of the drive shaft, and a characteristic that an elastic-member stiffness coefficient of an elastic member 223, 224 in a direction along or parallel to the axis $L_4$ along the length direction of the cleaning element is far less than that of the elastic member along a direction perpendicular to the axis $L_4$ along the length direction of the cleaning element; a characteristic that the alternating electromagnetic force to which the permanent magnets 225, 226 are subject is approximately parallel to an external force applied to the cleaning element along the axis $L_4$ along the length direction of the cleaning element; a characteristic that the elastic members 223, 224 may also be a reset spring for the movable component without the need for adding an extra reset spring, and so on, which effectively saves the material cost and the labor cost and realizes the miniaturization of the electric toothbrush. On the transducer transmission arms 235, 236 in the movable component is provided a light reflecting surface 241, on a circuit board in a stationary component are provided a light source 272 and a photosensitive unit 271, and the light emitted by the light source is reflected by the light reflecting surface 241 to the photosensitive unit 271. Under the combined action of the external force along the axis $L_4$ along the length direction of the cleaning element and the elastic-member elastic force, the analysis of the relationship of the light source and the photosensitive unit provided on the stationary component and the light reflecting surface provided on the movable component, especially the relationship of the three when there is no external force on the cleaning element and when there is an external force on the cleaning element, is similar to that in the first embodiment, and will not be repeated here any longer. The stationary component is stationary relative to the handle housing. In this embodiment, the following is cleverly utilized: a structure in which the elastic members 223, 224 are symmetrically distributed along the longitudinal axis $L_5$ of the drive shaft; a characteristic that an elastic-member stiffness coefficient of the elastic member in a direction perpendicular to the longitudinal axis $L_5$ of the drive shaft and perpendicular to the length direction of the elastic member is far less than an elastic-member stiffness coefficient of the elastic member along the direction of the longitudinal axis $L_5$ of the drive shaft, and a characteristic that an elastic-member stiffness coefficient of an elastic member in a direction along or parallel to the axis $L_4$ along the length direction of the cleaning element is far less than that of the elastic member along a direction perpendicular to the axis $L_4$ along the length direction of the cleaning element; a characteristic that the alternating electromagnetic force to which the permanent magnets 225, 226 are subject is approximately parallel to an external force applied to the cleaning element along the axis $L_4$ along the length direction of the cleaning element; and a light reflecting surface provided on the movable component, and a light sensing part is employed. When the external force is applied to the cleaning element along the axis $L_4$ along the length direction of the cleaning element, the permanent magnets 225, 226 move toward a direction opposite to the external force, but the direction of the internal magnetic field lines of the permanent magnets 225, 226 is still approximately perpendicular to the direction of the internal magnetic field lines generated by the drive coil 227, that is, the angle between the two is unchanged. Moreover, the width of the drive coil is greater than the range of motion of the magnets. Therefore, in this embodiment, even if the drive coil is stationary relative to the handle housing and the permanent magnets 225, 226 move relative to the drive coil, the movement of the permanent magnets 225, 226 produced by the external force will still not affect the efficiency of converting electromagnetic energy to mechanical energy, and additional electromagnetic harmonics will not be generated, thereby effectively avoiding additional harmonic noise and vibration on the handle housing.

In summary, in the present invention, for the transmission-type electric cleaning care appliance, the drive assembly comprising the micro-motor 161 may integrally rotate around the axis $L_3$ of the rotation shaft of the brush head interface member under the action of the external force $F_1$, that is, the motor stator part may also be integrally rotated with it around the axis $L_3$ of the rotation shaft of the brush head interface member under the action of the external force $F_1$, thereby overcoming the drawbacks of the existing transmission-type electric cleaning care appliances; and for the electric cleaning care appliances of the resonance oscillation type, the movement of the permanent magnets 225, 226 produced by the external force will not affect the efficiency of converting electromagnetic energy to mechanical energy, and will not generate additional electromagnetic harmonics, thereby effectively avoiding additional harmonic noise and vibration on the handle housing.

Experiments show that the photosensitive pressure alarm device as described in the present invention may greatly increase the accuracy of pressure alarms. It can be seen from actual pressure alarm tests for extracted test samples that, as compared to the existing pressure alarm devices, the accuracy of the pressure alarm device of the present invention may be increased by 20 times.

What is claimed is:

1. A photosensitive pressure alarm device for a transmission-type electric cleaning care appliance, the cleaning care appliance comprising a handle housing composed of a handle upper shell (101) and a handle lower shell (102), and in the handle housing provided a brush head interface member (110) and a drive assembly comprising a micro-motor (161), a gearbox (140) and a drive shaft (190) rotating reciprocally around a longitudinal axis ($L_1$) driven by the micro-motor (161), and the drive assembly configured to integrally rotate around an axis ($L_3$) of a rotation shaft of the brush head interface member (110), and in the handle housing also provided an elastic member (150) playing a reset role and a motor frame (160) fixed in the handle housing, and on the motor frame (160) fixed a circuit board (170), and an upper end (151) of the elastic member (150) directly or indirectly coupled to the handle housing, the position of the upper end (151) of the elastic member unchanged relative to the handle housing, and a lower end (152) of the elastic member coupled to the micro-motor (161); and a cleaning assembly comprising a cleaning element (330);

the photosensitive pressure alarm device comprises a light sensing part composed of at least one light source (172, 572) and at least one photosensitive unit (171, 571), a light reflecting surface (141, 541) facing the at least one light source (172, 572) and the at least one photosensitive unit (171, 571), a detection circuit and an alarm part; wherein the at least one light source (172, 572) and the at least one photosensitive unit (171, 571) are provided on a side of the circuit board (170) facing the gearbox (140), the light reflecting surface (141, 541) is provided on the gearbox (140), and an incident angle and a reflection angle of the light emitted by the at least one light source (172, 572) on the light reflecting surface (141, 541) change, causing that a light receiving area of the at least one photosensitive unit which can receive the light from the at least one light source (172, 572) changes, and in turn resulting in change of the electrical performance of the at least one photosensitive unit (171, 571); the photosensitive pressure alarm device further comprises a light sensing shielding part provided around the light sensing part, and the light sensing shielding part is constituted by a recess side surface (143) and a recess top surface (144) of a recess provided in the gearbox (140).

2. The photosensitive pressure alarm device as claimed in claim 1, wherein the at least one light source (172, 572) is a stable light source actively emitting light, and the at least one photosensitive unit (171, 571) is an electronic device of which the resistance value or the conductivity changes significantly after being illuminated by light.

3. The photosensitive pressure alarm device as claimed in claim 2, wherein the at least one light source (172, 572) is an LED, and the at least one photosensitive unit (171, 571) is a photosensitive resistor.

4. The photosensitive pressure alarm device as claimed in claim 1, wherein a distance from an action point of the elastic force produced by the elastic member (150) to the axis ($L_3$) of the rotation shaft of the brush head interface member (110) is greater than 0.35 times a distance from an action point of the external force ($F_1$) to the axis ($L_3$) of the rotation shaft of the brush head interface member (110).

5. The photosensitive pressure alarm device as claimed in claim 1, wherein the at least one light source (172, 572) is provided next to the at least one photosensitive unit (171, 571), the at least one light source (172, 572) and/or the at least one photosensitive unit (171, 571) partially or completely enters the light sensing shielding part; the at least one light source (172, 572), the at least one photosensitive unit (171, 571) and the light reflecting surface (141, 541) maintain a gap with each other, and the gap is greater than 0.1 mm.

6. A photosensitive pressure alarm device for an electric cleaning care appliance of the resonance oscillation type, the cleaning care appliance comprising a handle housing (201), a drive assembly, a stationary component and a cleaning assembly comprising a cleaning element (230); the photosensitive pressure alarm device comprises a light sensing part composed of at least one light source (272) and at least one photosensitive unit (271), a light reflecting surface (241) facing the at least one light light source (272) and the at least one photosensitive unit (271), a detection circuit and an alarm part; wherein the drive assembly comprises a driver bracket (221, 222) fixed in the handle housing (201), a drive shaft (220), two transducer drive arms symmetrically distributed along a longitudinal axis ($L_5$) of the drive shaft (220), two permanent magnets (225, 226) which are provided below the two transducer drive arms (235, 236) away from the cleaning element (230) and of which the directions of the internal magnetic field lines are opposite, and a drive coil (227) provided between the two permanent magnets (225, 226); wherein the drive assembly further comprises elastic members (223, 224) respectively fixedly coupled to the upper ends of the two transducer drive arms (235, 236) close to the cleaning element (230) via an elastic-member fixing member (237); the drive shaft (220), the two transducer drive arms (235, 236) and the two permanent magnets (225, 226) are movable components, the stationary component comprises a circuit board, the at least one light source (272) and the at least one photosensitive unit (271) are provided on the circuit board, the light reflecting surface (241) is provided on the two transducer drive arms (235, 236) in the movable components, and the light emitted by the at least one light source (272) is reflected by the light reflecting surface (241) to the at least one photosensitive unit (271).

7. The photosensitive pressure alarm device as claimed in claim 6, wherein the elastic members (223, 224) are sheet-shaped members, the elastic members (223, 224) are symmetrically distributed along the longitudinal axis ($L_5$) of the drive shaft, and the length of the elastic members (223, 224) along a direction of the elastic members (223, 224) from the elastic-member fixing member (237) toward a corresponding transducer drive arm (235, 236) and the width of the elastic members along a direction of the elastic members (223, 224) parallel to the longitudinal axis ($L_5$) of the drive shaft (220) are equal to or greater than 5 times the thickness of the elastic members (223, 224).

8. The photosensitive pressure alarm device as claimed in claim 7, wherein an elastic-member stiffness coefficient of the elastic members (223, 224) in a direction perpendicular to the longitudinal axis ($L_5$) of the drive shaft and perpendicular to the length direction of the elastic members is far less than an elastic-member stiffness coefficient of the elastic members along the direction of the longitudinal axis ($L_5$) of the drive shaft, and the elastic-member stiffness coefficient of the elastic members (223, 224) in the direction perpendicular to the longitudinal axis ($L_5$) of the drive shaft and perpendicular to the length direction of the elastic members is equal to or less than $1/10$ of an elastic-member stiffness coefficient of the elastic members along a length direction of the cleaning element.

* * * * *